United States Patent
Raha et al.

(10) Patent No.: US 12,141,683 B2
(45) Date of Patent: Nov. 12, 2024

(54) PERFORMANCE SCALING FOR DATAFLOW DEEP NEURAL NETWORK HARDWARE ACCELERATORS

(71) Applicant: Intel Corporation, Santa Clara, CA (US)

(72) Inventors: Arnab Raha, Santa Clara, CA (US); Debabrata Mohapatra, Santa Clara, CA (US); Gautham Chinya, Sunnyvale, CA (US); Guruguhanathan Venkataramanan, Livermore, CA (US); Sang Kyun Kim, San Jose, CA (US); Deepak Mathaikutty, Santa Clara, CA (US); Raymond Sung, San Francisco, CA (US); Cormac Brick, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 833 days.

(21) Appl. No.: 17/246,341

(22) Filed: Apr. 30, 2021

(65) Prior Publication Data

US 2021/0271960 A1 Sep. 2, 2021

(51) Int. Cl.
*G06F 17/10* (2006.01)
*G06F 9/30* (2018.01)
*G06N 3/04* (2023.01)
*G06N 3/063* (2023.01)

(52) U.S. Cl.
CPC ........... *G06N 3/063* (2013.01); *G06F 9/3001* (2013.01); *G06N 3/04* (2013.01)

(58) Field of Classification Search
CPC ....................................................... G06F 9/3001
See application file for complete search history.

(56) References Cited

U.S. PATENT DOCUMENTS

| | | | |
|---|---|---|---|
| 11,204,977 B2 * | 12/2021 | Maiyuran | G06F 17/16 |
| 11,294,677 B2 * | 4/2022 | Suh | G06F 9/30036 |
| 11,354,257 B2 * | 6/2022 | Borgonovo | G06F 7/4806 |
| 11,467,833 B2 * | 10/2022 | Alexander | G06F 9/30101 |
| 11,468,303 B2 * | 10/2022 | Mellempudi | G06N 3/063 |
| 11,501,139 B2 * | 11/2022 | Mellempudi | G06N 3/063 |

(Continued)

OTHER PUBLICATIONS

Xuan Yang et al. "Interstellar: Using Halide's Scheduling Language to Analyze DNN Accelerators" arXiv:1809.04070v2 [cs.DC], 15 pages (Apr. 26, 2020).

(Continued)

*Primary Examiner* — Cheng Yuan Tseng
(74) *Attorney, Agent, or Firm* — Akona IP PC

(57) ABSTRACT

Embodiments of the present disclosure are directed toward techniques and configurations enhancing the performance of hardware (HW) accelerators. Disclosed embodiments include static MAC scaling arrangement, which includes architectures and techniques for scaling the performance per unit of power and performance per area of HW accelerators. Disclosed embodiments also include dynamic MAC scaling arrangement, which includes architectures and techniques for dynamically scaling the number of active multiply-and-accumulate (MAC) within an HW accelerator based on activation and weight sparsity. Other embodiments may be described and/or claimed.

20 Claims, 20 Drawing Sheets

(56) References Cited

U.S. PATENT DOCUMENTS

| | | | |
|---|---|---|---|
| 11,636,174 B2* | 4/2023 | Maiyuran | G06F 17/16 712/19 |
| 2018/0322390 A1* | 11/2018 | Das | G06F 7/5443 |
| 2019/0079801 A1 | 3/2019 | Lyuh et al. | |
| 2019/0370645 A1 | 12/2019 | Lee et al. | |
| 2020/0104692 A1 | 4/2020 | Hill et al. | |
| 2020/0210175 A1* | 7/2020 | Alexander | G06N 3/045 |
| 2020/0225996 A1 | 7/2020 | Sharma et al. | |
| 2020/0285950 A1 | 9/2020 | Baum et al. | |
| 2020/0293867 A1 | 9/2020 | Shao et al. | |
| 2020/0380370 A1 | 12/2020 | Lie et al. | |
| 2020/0410327 A1 | 12/2020 | Chinya et al. | |
| 2021/0019631 A1* | 1/2021 | Das | G06F 9/3893 |
| 2021/0271960 A1* | 9/2021 | Raha | G06N 3/04 |
| 2022/0058158 A1* | 2/2022 | Maiyuran | G06F 15/8046 |
| 2022/0147804 A1* | 5/2022 | Guan | G06F 7/50 |
| 2022/0327101 A1* | 10/2022 | Pool | G06F 16/215 |
| 2023/0030287 A1* | 2/2023 | Sen | G06F 21/55 |

OTHER PUBLICATIONS

Norman P. Jouppi et al., "In-Datacenter Performance Analysis of a Tensor Processing Unit", ISCA '17: Proceedings of the 44th Annual International Symposium on Computer Architecture, pp. 1-12 (Jun. 24, 2017), https://dl.acm.org/doi/pdf/10.1145/3079856.3080246.

Kiseok Kwon et al., "Co-Design of Deep Neural Nets and Neural Net Accelerators for Embedded Vision Applications", arXiv:1804.10642v1 [cs.DC], 6 pages (Apr. 20, 2018).

Thierry Moreau et al., "A Hardware-Software Blueprint for Flexible Deep Learning Specialization", arXiv:1807.04188v3 [cs.LG], 7 pages (Apr. 23, 2019).

Minsoo Rhu et al., "Compressing DMA Engine: Leveraging Activation Sparsity for Training Deep Neural Networks", arXiv:1705.01626v1 [cs.LG], 14 pages (May 3, 2017).

Ali Shafiee et al., "ISAAC: A Convolutional Neural Network Accelerator with In-Situ Analog Arithmetic in Crossbars", 2016 ACM/IEEE 43rd Annual International Symposium on Computer Architecture (ISCA), pp. 14-26 (Jun. 2016).

Vivienne Sze et al., "Efficient Processing of Deep Neural Networks: A Tutorial and Survey", arXiv:1703.09039v2 [cs.CV], 32 pages (Aug. 13, 2017).

Vivienne Sze et al., "How to Evaluate Deep Neural Network Processors", IEEE Solid-State Circuits Magazine, vol. 12, No. 3, pp. 28-41 (Aug. 25, 2020), https://www.rle.mit.edu/eems/wp-content/uploads/2020/09/2020_sscs_dnn.pdf.

Yu-Hsin Chen et al., "Eyeriss: An Energy-Efficient Reconfigurable Accelerator for Deep Convolutional Neural Networks," IEEE International Solid-State Circuits Conference, San Francisco, CA, pp. 261-263 (Jan. 31-Feb. 4, 2016).

Sharan Chetlur et al., "cuDNN: Efficient Primitives for Deep Learning", arXiv:1410.0759v3 [cs.NE], 9 pages (Dec. 18, 2014), https://arxiv.org/pdf/1410.0759.pdf.

Zidong Du et al., "ShiDianNao: Shifting Vision Processing Closer to the Sensor", Proceedings of the 42nd Annual Int'l Symposium on Computer Architecture (ISCA '15), pp. 92-104 (Jun. 2015), https://doi.org/10.1145/2749469.2750389.

Clement Farabet et al., "NeuFlow: A Runtime Reconfigurable Dataflow Processor for Vision", IEEE/CVF Conference on Computer Vision and Pattern Recognition Workshops (CVPR) 2011 Workshops, pp. 109-116 (2011), doi: 10.1109/CVPRW.2011.5981829.

Jeremy Fowers et al., "A Configurable Cloud-Scale DNN Processor for Real-Time AI", Proceedings of the 45th Annual Int'l Symposium on Computer Architecture, pp. 1-14 (Jun. 2, 2018), https://www.microsoft.com/en-us/research/uploads/prod/2018/06/ISCA18-Brainwave-CameraReady.pdf.

Hyoukjun Kwon et al., "An Analytic Model for Cost-Benefit Analysis of Dataflows in DNN Accelerators", arXiv:1805.02566v2 [cs.DC], 12 pages (Sep. 13, 2018), https://arxiv.org/pdf/1805.02566v2.pdf.

Hyoukjun Kwon et al., "Understanding Reuse, Performance, and Hardware Cost of DNN Dataflows: A Data-Centric Approach Using MAESTRO", arXiv:1805.02566v6 [cs.DC], 15 pages (May 11, 2020), https://arxiv.org/pdf/1805.02566.pdf.

International Search Report and Written Opinion mailed Jun. 30, 2022 for International Patent Application No. PCT/US2022/021174, 13 pages.

Mostafa Mahmoud et al., "TensorDash: Exploiting Sparsity to Accelerate Deep Neural Network Training", 53rd Annual IEEE/ACM International Symposium on Microarchitecture (MICRO), 15 pages (Nov. 11, 2020).

Jie-Fang Zhang et al., "SNAP: An Efficient Sparse Neural Acceleration Processor for Unstructured Sparse Deep Neural Network Inference", IEEE Journal of Solid-State Circuits, vol. 56, Issue: 2, 12 pages (Jan. 8, 2021).

* cited by examiner

PERFORMANCE SCALING FOR DATAFLOW DEEP NEURAL NETWORK HARDWARE ACCELERATORS

FIELD

Embodiments of the present disclosure generally relate to the field of optoelectronics and more particularly, to techniques and configurations for scaling the performance per Watt and performance per area of hardware (HW) accelerators and dynamically scaling the number of active multiply-and-accumulate (MAC) based on a level of activation and weight sparsity in data for improving resource efficiency in HW accelerators.

BACKGROUND

Machine learning (ML) architectures are typically based on artificial neural networks (ANNs), which are inspired by signal processing in the biological brains. ANNs have and continue to be adopted as the underlying technical solutions in a wide range of technical fields, such as computer vision, facial recognition, speech recognition, navigation, market research, robotics, among many others. As such, the field of ANNs has and continues to grow rapidly, both in terms of inference algorithm development, as well as hardware platform development to implement the evolving inference algorithms. The network layers of ANNs, such as deep neural networks (DNNs) and deep learning convolutional neural networks (CNNs), come in many possible tensor shapes, the dimensions of which continue to change as existing ANN inference algorithms are revised and/or new ANN inference algorithms are developed. Furthermore, while ANNs deliver state-of-the-art accuracy on many ML tasks, it comes at the cost of high computational complexity and increased computational resource consumption.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
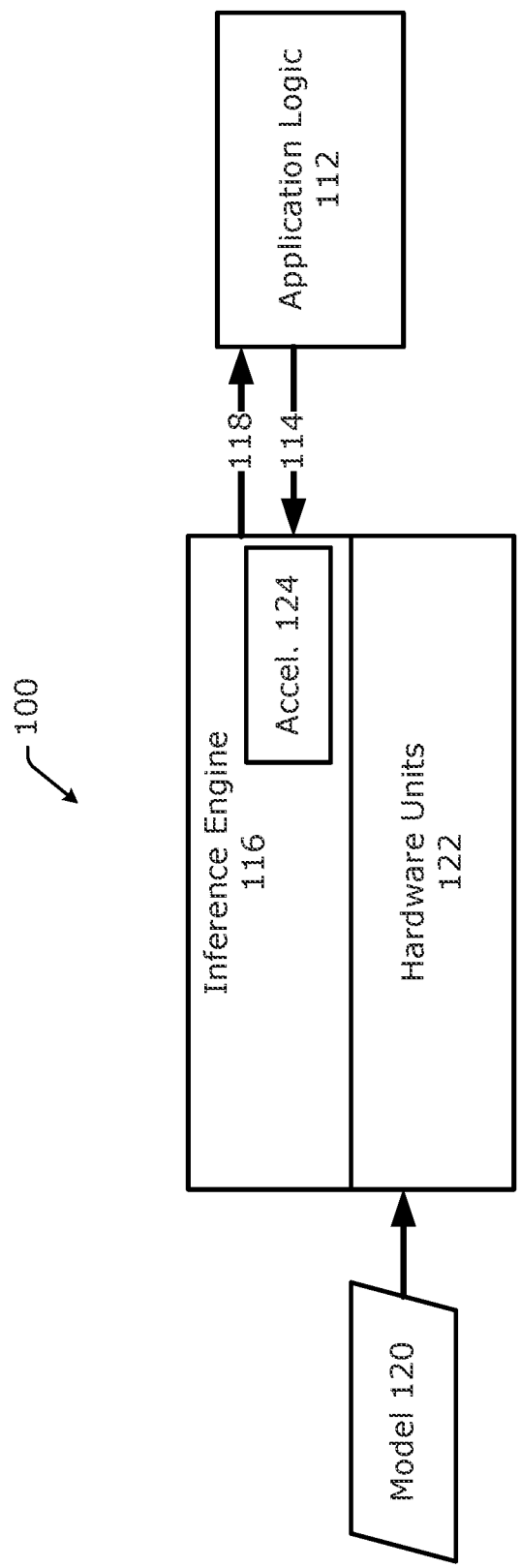
FIG. 1 illustrates an neural network (NN) example accelerator architecture according to various embodiments.

Disclosed embodiments provide resource consumption efficiencies for HW accelerators in edge and cloud compute nodes, and deliver longer battery life in edge nodes, while running modern ML/AI workloads efficiently. In particular, disclosed embodiments provide optimal tera-operations per second (TOPS), TOPS per watt (TOPS/W), and TOPS per chip and/or circuit board area (TOPS/mm$^2$) for HW accelerators, as well as providing faster computation speeds (e.g., clock rates larger than 10 Giga-Hertz (GHz) and/or picosecond intrinsic computational speeds). There is a growing trend towards deploying more and more hardware (HW) accelerators in energy constrained devices, such as edge compute nodes and/or cloud compute nodes, for various performing machine learning (ML) and artificial intelligence (AI) tasks (e.g., ML/AI predictions and/or inferences). For these purposes, hardware accelerator configurations and arrangements that have a small size and/or area, provide high performance with low energy consumption are of paramount significance.

Disclosed embodiments include systems and configurations for scaling the performance per Watt and performance per area of HW accelerators, which may be used in resource constrained devices. These systems and configurations are referred to herein as "static multiply-and-accumulate (MAC) scaling" and is sometimes referred to as "ScaleMAC." static MAC scaling includes an enhanced multiply-and-accumulate (MAC) processing element (PE) microarchitecture for HW accelerators. The static MAC scaling microarchitecture intelligently constructs and feeds data to M MACs (where M is a number) in a single PE that improves the overall peak TOPS, TOPS/W, and TOPS/mm$^2$ advantage for DNN accelerators. This is achieved primarily by scaling up the number of MAC units while keeping the storage capacity (e.g., the size of register files (RF) and memory buffers) to be the same.

Disclosed embodiments also include systems and configurations for dynamically scaling the number of active MACs based on a level of activation and weight sparsity in data for improving resource usage efficiency in HW Accelerators. These systems and configurations are referred to herein as "dynamic MAC scaling" and is sometimes referred to as "DynaMAC." Dynamic MAC scaling is a technique to dynamically enable or disable (e.g., turn ON and OFF) sections of one or more compute nodes to modulate the total number of MACs involved in active computations. In these embodiments, the number of enabled or disabled compute nodes which relies on the level of sparsity in activation and weight data. Dynamic MAC scaling is an on-demand compute resource provisioning scheme based on compute requirement that keeps changing dynamically within DNN accelerators. Moreover, the uniqueness of dynamic MAC scaling is augmented via a feedback mechanism, which is based on the performance obtained with a fraction of the total number of available MACs. In these embodiments, if the use of a certain number of MACs is found to be inferior to an expected level of performance, a threshold for enabling/disabling one or more MACs is adjusted thereby maintaining the desired level of performance. In some implementations, the level of performance may be measured in terms of number of clock cycles. Other embodiments may be described and/or claimed.

1. Neural Network Acceleration Aspects

FIG. 1 is an example accelerator architecture 100 for according to various embodiments. The accelerator architecture 100 provides ANN (e.g., DNN) functionality to one or more application logic(s) 112, and as such, may be referred to as a neural network (NN) accelerator architecture 100, DNN accelerator architecture 100, and/or the like. The application logic 112 may include application software and/or hardware components used to perform specification functions. The application logic 112 forwards data 114 to an inference engine 116. The inference engine 116 is a runtime element that delivers a unified application programming interface (API) that integrates a ANN (e.g., DNN or the like) inference with the application logic 112 to provide a result 118 (or output) to the application logic 112.

To provide the inference, the inference engine 116 uses a model 120 that controls how the DNN inference is made on the data 114 to generate the result 118. Specifically, the model 120 includes a topology of layers of the DNN. The topology includes an input layer that receives the data 114, an output layer that outputs the result 118, and one or more hidden layers between the input and output layers that provide processing between the data 114 and the result 118. The topology may be stored in a suitable information object, such as an extensible markup language (XML), JavaScript Object Notation (JSON), and/or other suitable file and/or the like. The model 120 may also include weights and/or biases for results for any of the layers while processing the data 114 in the inference using the DNN.

The inference engine 116 may be implemented using and/or connected to hardware unit(s) 122. The hardware unit(s) 122 may include one or more processors and/or one or more programmable devices. As examples, the processors may include central processing units (CPUs), graphics processing units (GPUs), vision processing units (VPUs), tensor processing units (TPUs), Neural Compute Engine (NCE), and the like. The programmable devices may include, for example, logic arrays, programmable logic devices (PLDs) such as complex PLDs (CPLDs), field-programmable gate arrays (FPGAs), programmable Application Specific Integrated Circuits (ASICs), programmable System-on-Chip (SoC), and the like. Furthermore, the inference engine 116 may include one or more accelerators 124 that provide hardware acceleration for the DNN inference using one or more hardware units 122. As discussed in more detail infra, the one or more accelerators 124 may include a multiply-and-accumulate (MAC) architecture according to the various embodiments discussed herein, and may be static and/or dynamically scaled according to the various embodiments discussed herein. The processor(s) and/or programmable devices may correspond to processor circuitry 1852 of FIG. 18 and the accelerator(s) 124 may correspond to the acceleration circuitry 1864 of FIG. 18 described infra.

Figure 2A:
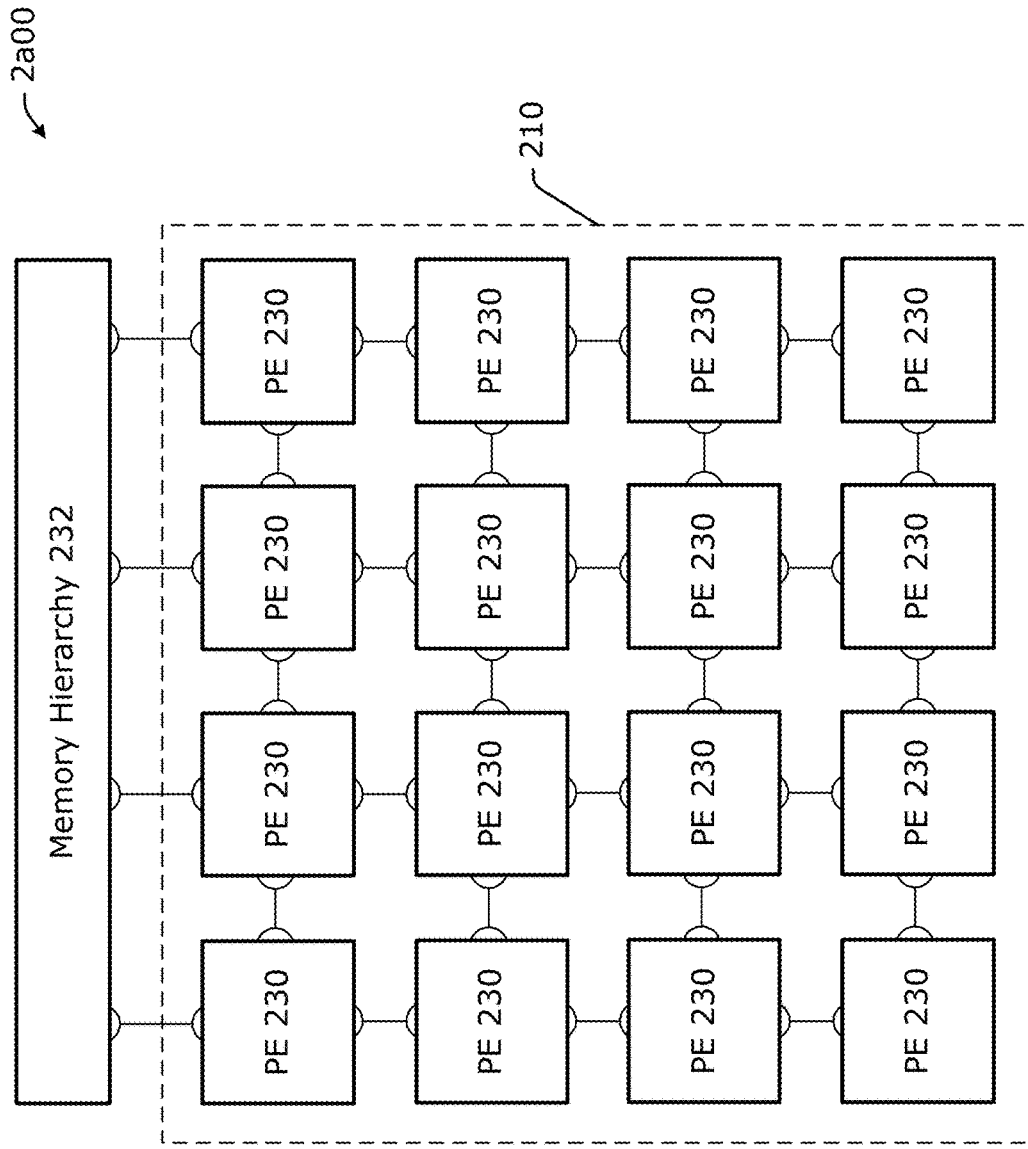
FIGS. 2a and 2b illustrate an example accelerator with a spatial array architecture according to various embodiments.
Figure 2B:
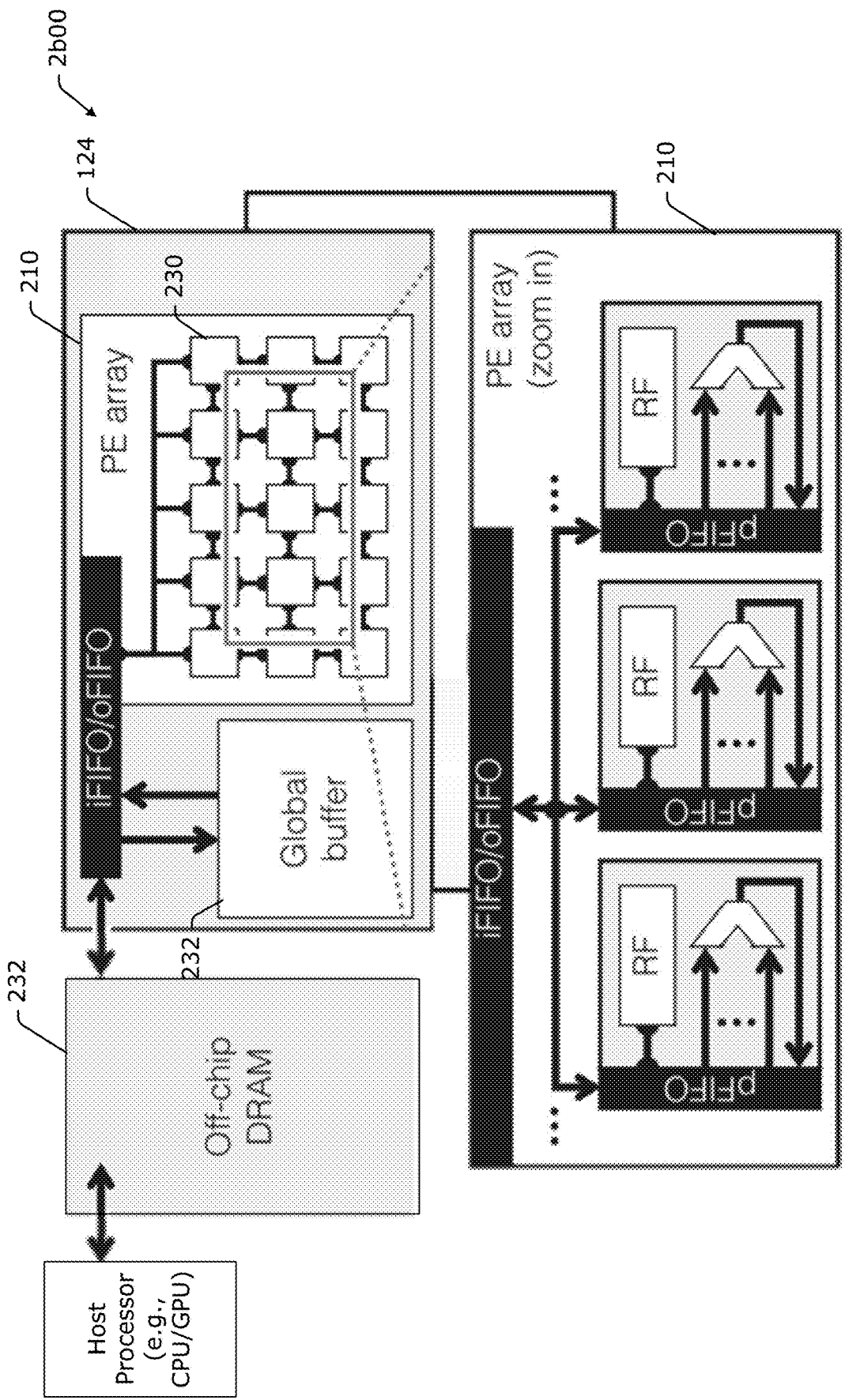

FIGS. 2a and 2b illustrate an example spatial array architecture 2a00 and 2600 according to various embodiments. The spatial array architecture 2a00 and 2b00 (collectively referred to as "architecture 200" or the like) may be implemented in or by the acceleration circuitry 1864 of FIG. 18 and/or accelerator(s) 124 of FIG. 1. As illustrated by both FIGS. 2a and 2b, the architecture 200 includes a spatial array 210 of processing elements (PEs) 230 and a memory hierarchy 232. The spatial array 210 may also be referred to as "PE array 210" or the like. The memory hierarchy 232 may be a local memory 232. The memory hierarchy 232 may include RFs (e.g., RFs 608 of FIG. 6) and/or one or more memory banks (or memory buffers). As discussed in more detail infra, in various embodiments, the RF of each PE 230 may be split into a plurality of RF instances. The one or more memory banks may include dynamic random-access memory (DRAM) and/or static random access memory (SRAM) banks. For predictions/inference tasks, the weights or filters may be pre-trained and layer-specific, and are loaded to the PE array 210 from the memory 232 (e.g., DRAM and/or SRAM banks). Input data, known as input activations or feature maps, are also brought in to the PE array(s) 210. Inside the PEs 230, multiply-and-accumulate (MAC) operations are performed in respective MAC operators through multiple input channels ($I_C$) to generate output activations ($O_c$). Multiple sets of weight tensors may be used against a given set of activations to produce an output tensor volume. Non-linear functions may be applied to the output activations that, in turn, become input activations for a next layer. In some implementations, there may be multiple PE array 210 stacked on top of one another, creating a three dimensional PE array 210 (or multi-layer arrays of PEs 230).

As examples, the non-linear functions may be Rectified Linear Units ("ReLUs" or "rectifiers") or Parametric ReLUs ("PReLUs"). ReLUs are activation functions that compute the function $f(x)=\max(0, x)$, where the activation of a ReLU is zero when $x<0$ and linear with slope 1 when $x>0$ (e.g., the activation is thresholded at zero). PReLUs, are activation functions that compute the function $$f(y_i) = \begin{cases} y_i, & \text{if } y_i > 0 \\ a_i y_i, & \text{if } y_i \leq 0 \end{cases}$$

where $y_i$ is the input of the nonlinear activation function $f$ on the i-th channel, and $a_i$ is a coefficient (a "leak parameter") controlling the negative slope such that when $a_i=0$, the PRELU becomes an ReLU and when $a_i$ is a relatively small number (e.g., $a_i=0.01$), the PRELU becomes a leaky ReLU. In this way, PRELUs make the coefficient of leakage into a parameter that is learned along with other neural network parameters. In other words, PRELUs learn a leak parameter a in order to find a proper positive slope for negative inputs, which prevents negative neurons from dying (i.e., neurons that are always equal to zero) due to null derivatives that block back-propagated error signals.

Figure 6:
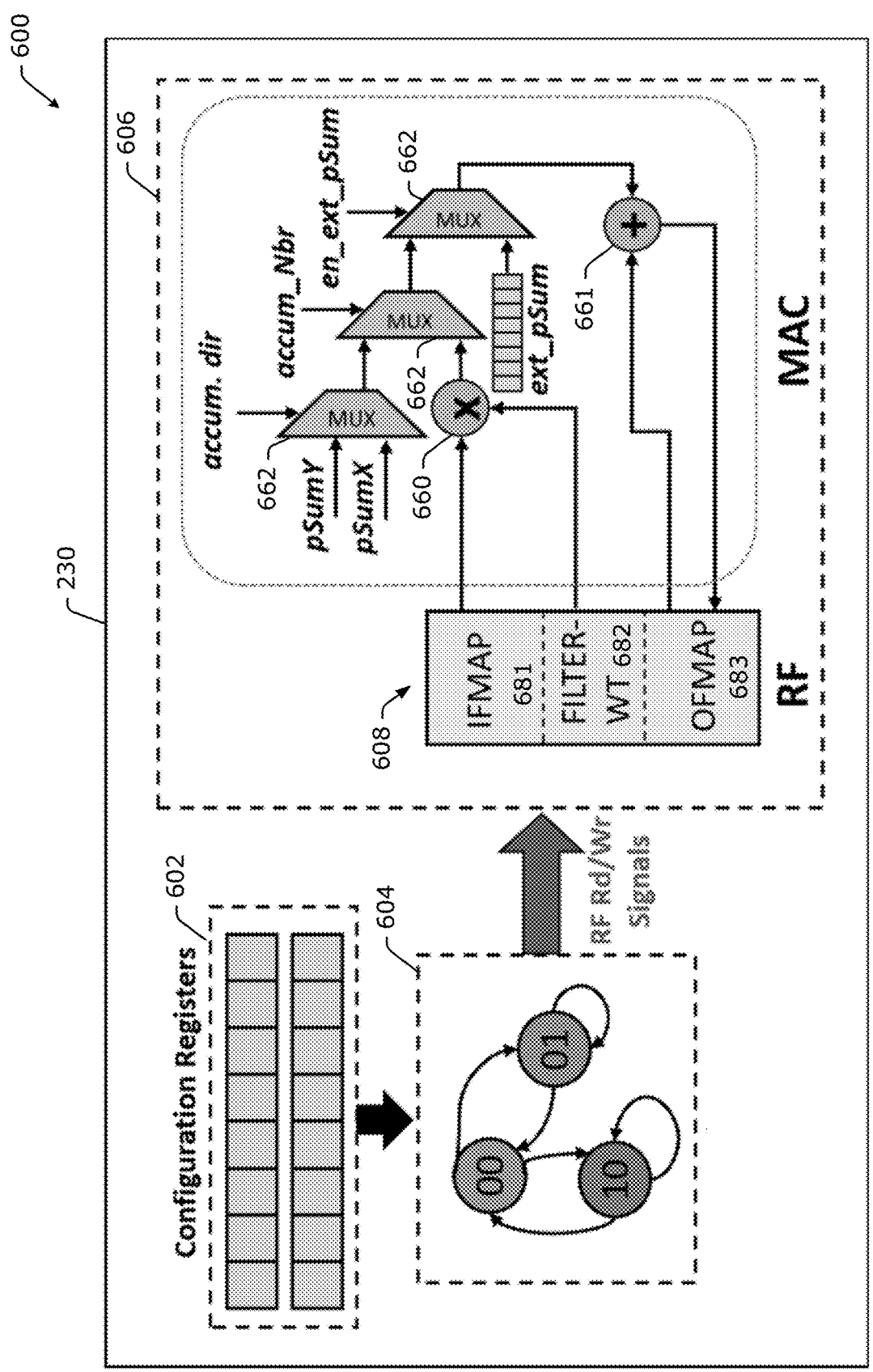
FIG. 6 depicts an example processing element (PE) microarchitecture of a flexible DNN accelerator according to various embodiments.

Referring now to FIG. 2b, the multilevel storage hierarchy 232 may include off-chip DRAM, (on-chip) global buffer, a network-on-chip (NoC) (not shown by FIG. 2b), and register file (RF) in the PE 230 (e.g., the RF may be the same or similar as RF 608 of FIG. 6). The off-chip DRAM, global buffer, and PEs 230 in the array 210 can communicate with each other directly via a first-in-first-out (FIFO) buffer including an input FIFO (iFIFO) and output FIFO (oFIFO). The storage hierarchy 232 can be used to exploit data reuse in a four-level setup (in decreasing energy-cost order):

DRAM, global buffer, NoC for inter-PE 230 communication, and RF in the PE 230 as local scratchpads. In some implementations, the global buffer is implemented as a set of on-chip SRAM banks. Additionally or alternatively, the global buffer can be replaced with and/or arranged into a set of column buffers, each of which is associated with corresponding columns of PEs 230 in the PE array 210. The column buffers may include respective output data processors capable of performing truncation and/or ReLU operations on data being output from the PEs 230 for storage in the memory 232. The PE array 210 provides high parallelism for high throughput. Within each PE 230, a PE FIFO (pFIFO) controls traffic going in and out of an arithmetic logic unit (ALU) including from the RF and/or other storage levels.

In this architecture, all data types may be stored and accessed at any level of the storage hierarchy 232. Input data for the MAC operations (e.g., filter weights and IFMap) can be moved from the most expensive level (e.g., DRAM) to the lower-cost levels. Ultimately, they are usually delivered from the least expensive level (e.g., RF 608) to the ALU for computation. The results from the ALU (e.g., pSums) generally move in the opposite direction. The orchestration of this movement is determined by the mappings for a specific DNN shape and size under mapping rule constraints of a specific dataflow architecture.

Figure 3:
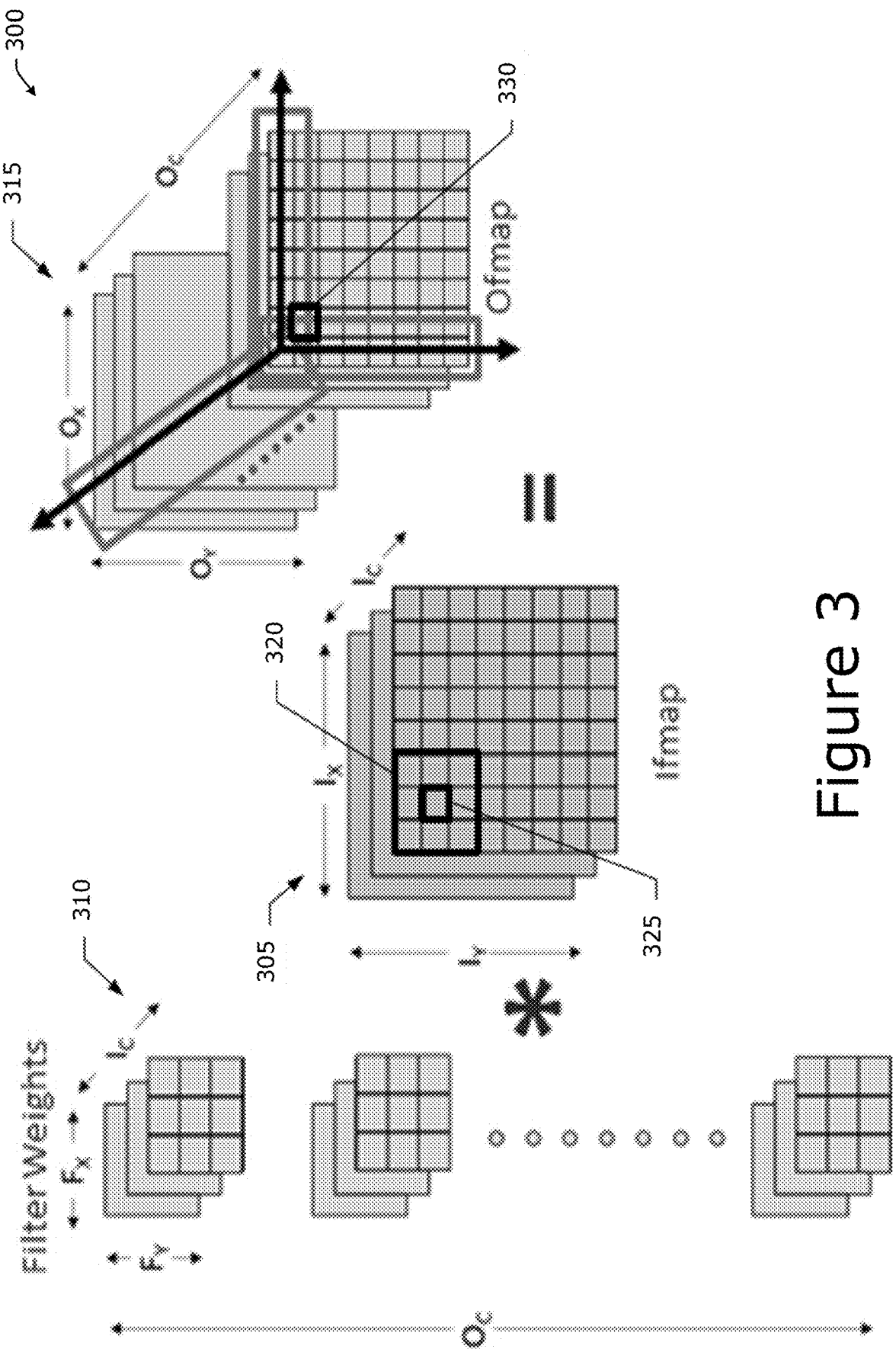
FIG. 3 illustrates an example tensor operation performed by a configurable processor element array according to various embodiments.

The PE array 210 can be configured based on a plurality of descriptors to implement a layer of a DNN based on a dataflow schedule corresponding to one of a plurality of tensor processing templates. The PEs 230 operate, based on the configured tensor processing template, on input activation data and filter data associated with a layer of the DNN to produce output activation data associated with the layer of the DNN. In embodiments, a compiler may convert a description of a layer of a DNN into a dataflow schedule corresponding to a selected one of a set of possible tensor processing templates. The possible tensor processing templates provide different ways to decompose an overall tensor operation to be performed by the configurable PE array 210 to implement a given DNN layer such that the overall tensor operation can be achieved by the combination of PEs 230 included in the configurable PE array 210. An example of the overall tensor operation to be performed by the configurable PE array 210 to implement a given DNN layer is illustrated by FIG. 3. The example of FIG. 3 also introduces notation to be used throughout the instant disclosure.

FIG. 3 shows an example tensor operation 300 corresponds to a DNN layer in which a set of input data 305 (also referred to as input activation data 305 or input activations 305) is to be processed (e.g., convolved) with a set of filter kernels 310 (also referred to as filter weights 310 or weights 310) to produce a set of output data 315 (also referred to as output activation data 315 or output activations 315). The input activations 305 are arranged in arrays having Ix elements in the x-dimension, $I_y$ elements in the y-dimension, and $I_c$ channels of input activation data. The dimensions $I_x$, $I_y$ and $I_c$ may be the same or different, and may be any value(s).

The input activation data 305 having dimensions $I_x$ by $I_y$ by $I_c$ is processed by a set of filters 310. The filters 310 are arranged in arrays having $F_x$ elements (e.g., weights) in the x-dimension, $F_y$ elements (e.g., weights) in the y-dimension, and $I_c$ elements in the channel dimension, the latter being the same as the number of channels $I_c$ of the input activation data. For example, the $F_x$ and $F_y$ dimensions may each correspond to 3 and 3 such that a 3 by 3 filter 310 is processed (e.g., convolved) with each input activation data element and its adjacent neighbors. The filters 310 may have other values for the $F_x$ and $F_y$ dimensions in other examples, and the $F_x$ and $F_y$ dimensions may be the same or different from each other.

The example tensor operation 300 of FIG. 3 involves convolving each of the filters 310 with the input activation data 305, and summing (accumulating) the resulting data over the channel dimension ($I_c$) to produce the output activation data 315. For example, a given filter 310a of the filters is convolved with a given portion 320 of the input activation data 305 centered at a given input activation data element 325. The result for each of the channel dimensions is summed (e.g., corresponding to accumulation over the $I_c$ dimensions) to produce an output activate data element 330 at an array position corresponding to the array position of the input activation data element 325, as shown. The convolving of each one of the filters 310 with the input activation data 305 produces the output activation data 315, which is arranged in arrays having $O_x$ elements in the x-dimension, $O_y$ elements in the y-dimension, and $O_c$ different channels of output activation data. The $O_x$ and $O_y$ dimensions may have the same value or different values, and may be the same or different from the $I_x$ and $I_y$ dimensions. The $O_c$ dimension may correspond to the number of different filters 310 convolved with the input activation data 305.

Other terminology used in the instant disclosure is as follows: "On" refers to a batch size (e.g., the number of images to be processed in parallel for the DNN to process images). The term "IF" refers to input activation data, the term "FL" refers to filter data (e.g., weights), and the term "OF" refers to output activation data. Furthermore, the term "Psum" or "pSum" refers to a partial result in a DNN operation, such as a convolution operation.

Figure 4:
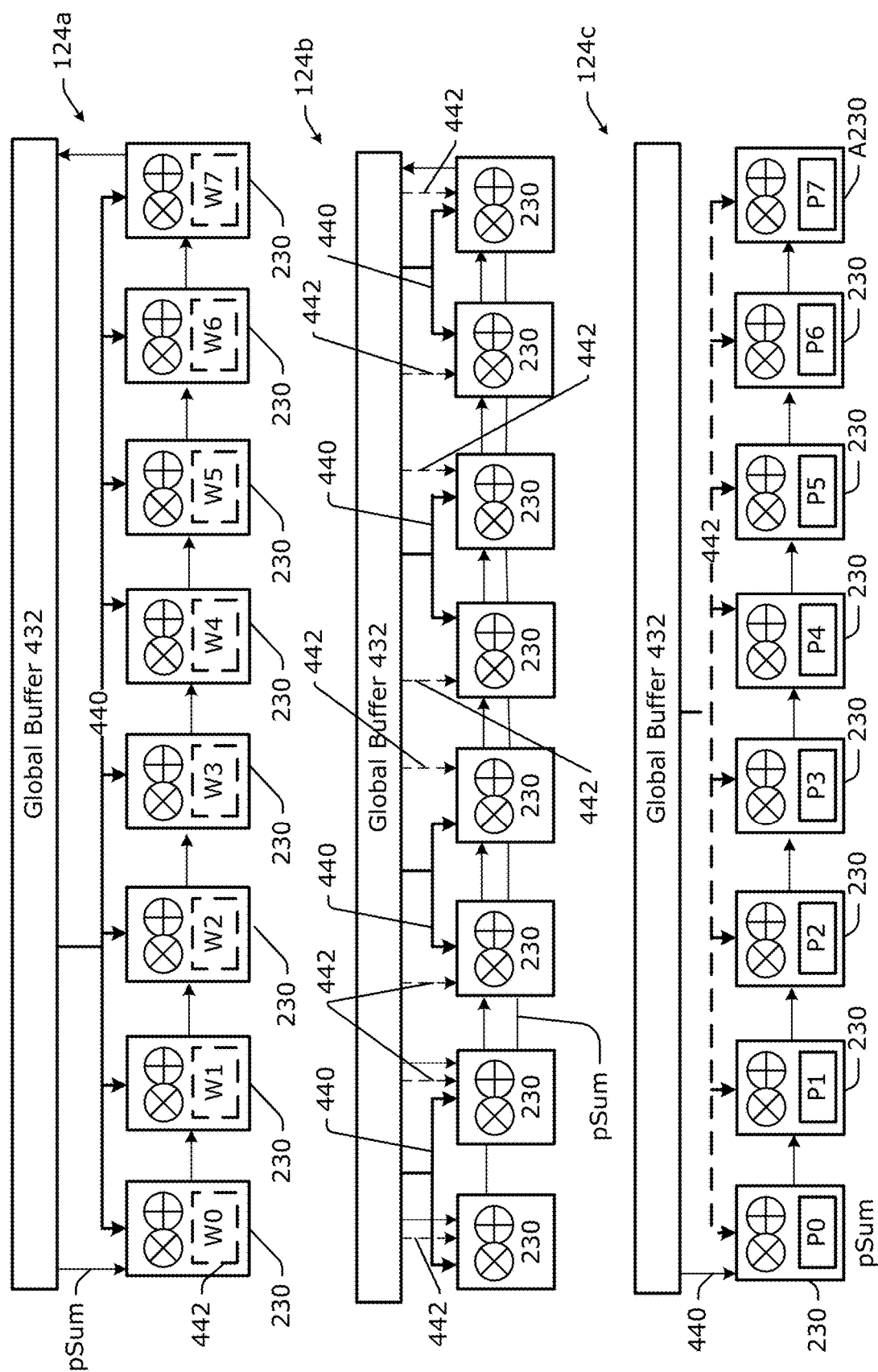
FIGS. 4 and 5 illustrates example accelerators with associated fixed schedules according to various embodiments.
Figure 5:
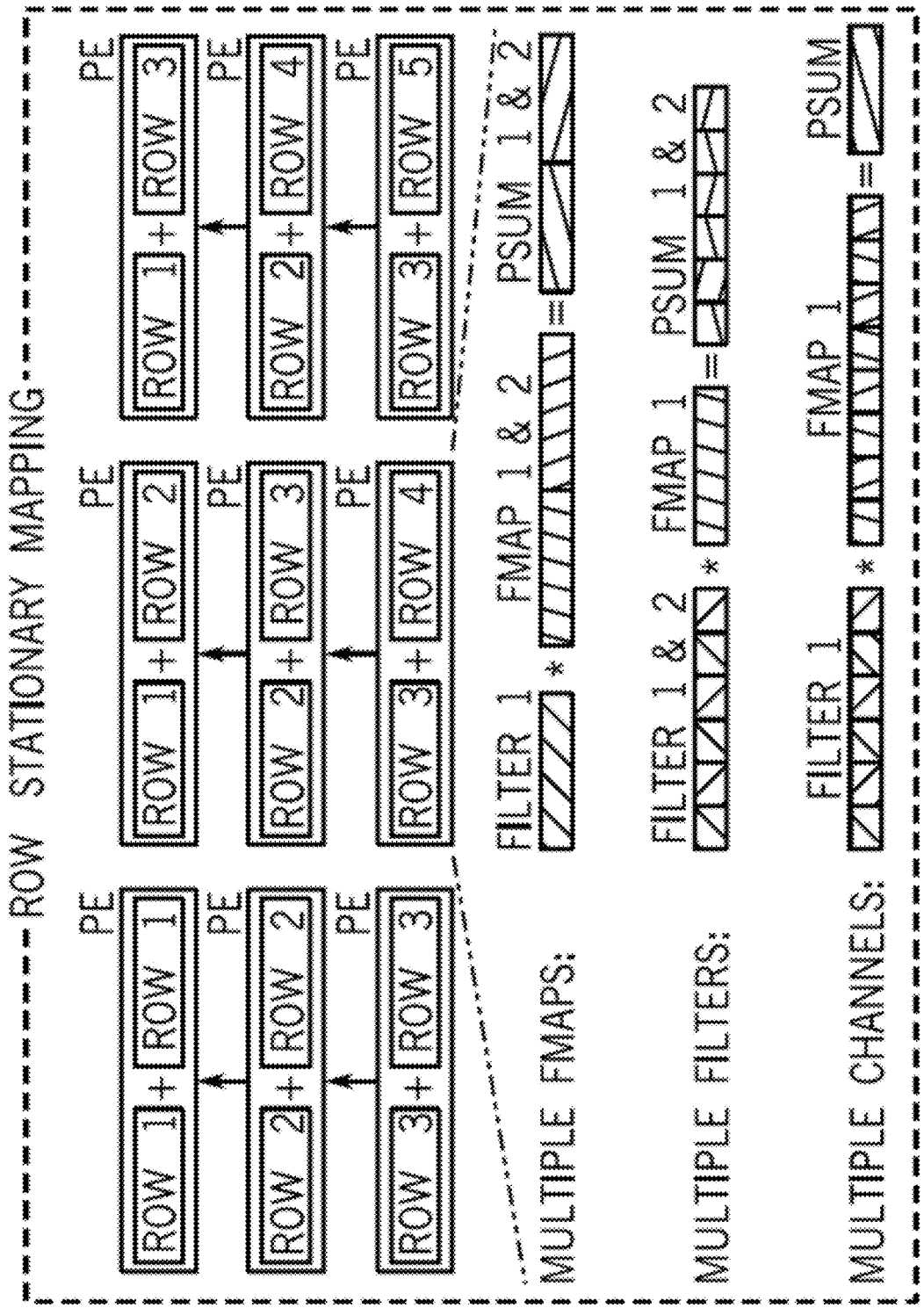

FIGS. 4 and 5 illustrate example DNN accelerators 124 that implement fixed schedules with fixed dataflows. In FIG. 4, the accelerator 124A (e.g., NeuFlow and ISAAC) implements a weight stationary (WS) schedule that uses a single parallel transmission of an activation 440 and minimizes weight 442 read energy consumption by maximizing convolutional flow and filtering reuse of weights (see e.g., H. Kwon et al., "An Analytic Model for Cost-Benefit Analysis of Dataflows in DNN Accelerators", arXiv: 1805.02566v2 [cs.DC] (13 Sep. 2018) ("[HKwon]", and see also [YChen2]). The accelerator 124B (e.g., DianNao, DaDianNao, TPU, Zhang-UCLA, and Google TPU) implements a no-local reuse (NLR) scheme that uses a large global buffer as shared storage to reduce DRAM access energy consumption (see e.g., Jouppi et al., "In-Datacenter Performance Analysis of a Tensor Processing Unit" Proceedings of the 44th Annual Int'l Symposium on Computer Architecture (ISCA), pgs. 1-12 (24 Jun. 2017) ("[Jouppi]")). The accelerator 124C (e.g., ShiDianNao and Movidius VPU2 with sparsity) implements an output stationary schedule that minimizes partial sum read/write energy consumption by maximizing local accumulation. The accelerator 124D (e.g., Eyeriss) in FIG. 5 implements a row stationary schedule (see e.g., Y. Chen et al, "Eyeriss: An Energy-Efficient Reconfigurable Accelerator for Deep Convolutional Neural Networks," 43rd ACM/IEEE ISCA (June 2016) ("[YChen1]").

Additionally or alternatively, a schedule-aware tensor distribution module may be used, such as the flexible schedule-aware tensor data distribution module (FSAD) discussed in U.S. application Ser. No. 16/456,707 filed on Jun. 28, 2019 ("[AB6904]"), which is hereby incorporated by reference in its entirety.

2. Static Mac Scaling Embodiments

FIG. 6 shows an example microarchitecture 600 of an individual PE 230 in a DNN accelerator 124 according to various embodiments. As shown, the microarchitecture 600 includes a set of configuration registers 602, a finite state machine (FSM) 604, and the PE 230. The PE 230 includes a single MAC computation unit 606 and a set of register files (RF) 608. The RF 608 includes an input feature map (IFMap) 681, one or more filter-weights (WT) 682, and an output feature map (OFMap) 683.

The configuration registers 602 store configurable descriptors that control a dataflow based on a schedule specification for a particular inference. The set of configuration registers 602 accept values of descriptors, which are updated at the beginning of each layer of the DNN being processed by the PE 230. The descriptors include a set of the descriptor fields to support flexible dataflow schedules by controlling the appropriate sequencing of the various computation phases of input tensor data within the PEs 230 according to one or a set of possible tensor processing templates. Examples of such descriptors are shown in Table 1 of U.S. application Ser. No. 16/726,709 filed on Dec. 24, 2019 ("[AC3143]"), which is hereby incorporated by reference in its entirety. The set of descriptor fields applied to the configuration registers 602 are programmed via a configuration loader (not shown) to implement a dataflow schedule, based on a tensor processing template, to process tensor data for a current layer of the DNN being implemented. The FSM 604 includes internal counters and logic (e.g., glue logic) to generate RF read and write (Rd/Wr) control signals to drive the RF 608. The FSM 604 may also generate other control signals as discussed in [AC3143].

The MAC unit 606 is the fundamental computational module in the DNN accelerator 124. The logic of the MAC 606 includes an example multiplier 660, an example adder 661, and various multiplexer (MUX) control logic 662 (collectively referred to as MUX 662) to route the appropriate tensor data appropriately to implement the processing of the MAC 606. The PE 230 supports both internal and external partial sum (pSum) accumulation. The PE 230 can accept pSum from its neighboring PE in either the horizontal (pSumX) or the vertical direction (pSumY). The programmable descriptor fields of the configuration registers 602 can be used to specify the direction of internal accumulation via the "accum_dir" control signal. The "accum_Nbr" control signal is used to identify whether the accumulation of pSums is within the PE 230 or across PEs 230 and/or a permitted neighboring PEs 230. For external pSum accumulation, one set of values is held in an "ext_pSum" register while the second set of values resides in the OFMap 683. The MUX control signal "en_ext_pSum" is used to choose between internal pSum accumulation and external pSum accumulation. Other aspects of the configuration registers 602, FSM 604, MAC 606, RF 608, and PE 230 are discussed in [AB6904] and [AC3143].

Figure 7:
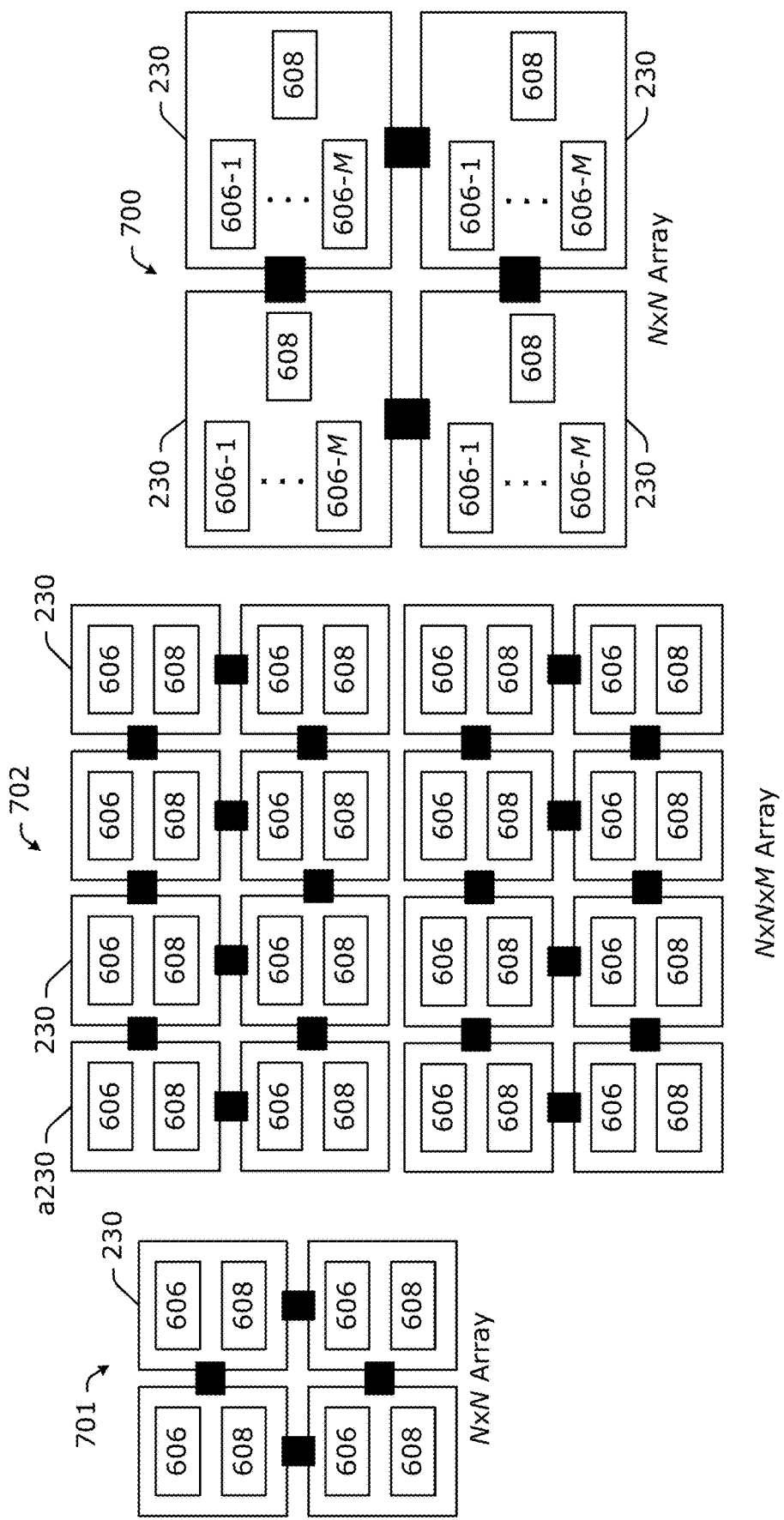
FIG. 7 depicts example static MAC scaling PE arrays according to various embodiments.

The PE 230 in FIG. 6 only includes one MAC 606, which means that the PE 230 can only perform one MAC operation per cycle. An entire N×N PE 230 compute array (where N is a number) can perform $N^2$ MAC operations at a maximum in each cycle corresponding to the optimal schedule for a particular layer. Examples of N×N PE 230 compute array are shown by FIGS. 2 and 7. Conventional techniques to scale peak TOPS for a DNN accelerator is to just blindly increase the number of PEs 230 of the accelerator 124. For example, to scale the TOPS by M amount from a baseline single MAC PE 230 accelerator 124 having N PEs, the total number of PEs 230 can be increased to N×M. Although, naively increasing the PEs 230 will increase the peak TOPS by M times in this example, the TOPS/W and TOPS/mm$^2$ will remain almost the same as the area and the components all are increased by the same amount. In other words, the conventional techniques for scaling peak TOPS do not increase TOPS/W and/or TOPS/mm$^2$.

By contrast, static MAC scaling improves the peak TOPS, TOPS/W, and TOPS/mm$^2$ in flexible dataflow DNN accelerators 124. As alluded to previously, static MAC scaling is a DNN accelerator 124 microarchitecture design technique that enables the number of MACs in each PE 230 of a flexible DNN accelerator 124 to be increased by M times while incurring negligible impact on the energy and/or the area footprint of the entire accelerator 124. The static MAC scaling microarchitecture increases the peak TOPS of the accelerator 124 by M times while also obtaining significant improvement in TOPS/mm$^2$ and TOPS/W.

In embodiments, accelerators 124 incorporating the static MAC scaling microarchitecture complete a convolution operation in M times less duration compared to conventional PEs 230 having a single MAC 606. The M number of MACs in each PE 230 requires M times wider data to be fed compared to a single MAC PE 230 where it was actually scheduled to be fed sequentially over time. In order to feed M times more MACS, we perform a time to space distribution of data to scale up the TOPs with the same number of PEs without a proportional impact on energy or area.

In various embodiments, the static MAC scaling PE 230 with M number of MACs 606 reuses the same RF 608 capacity and the same SRAM capacity in each PE 230 as for a single MAC 606. This increases the TOPS/mm$^2$ and TOPS/W as SRAM and RF embedded building blocks (EBBs) are the most dominant area and data movement from/to these blocks the most energy-consuming components in a DNN accelerator. The static MAC scaling architecture also has the flexibility to support various schedules (data flows) including stationary schedules and dynamic schedules as discussed in [AB6904] and [AC3143]. This flexibility achieves TOPS/W that is significantly larger than the conventional accelerators.

Additionally, sparsity is enabled within the static MAC scaling while supporting flexible dataflows. The static MAC scaling uses a suitable encoding scheme to compress the sparse data to reduce read and write operations (e.g., to and from the SRAM banks). The accelerator 124 load path and drain path are also modified to enable compressed data movement into and out of the PE 230 array of the accelerator 124.

Figure 12:
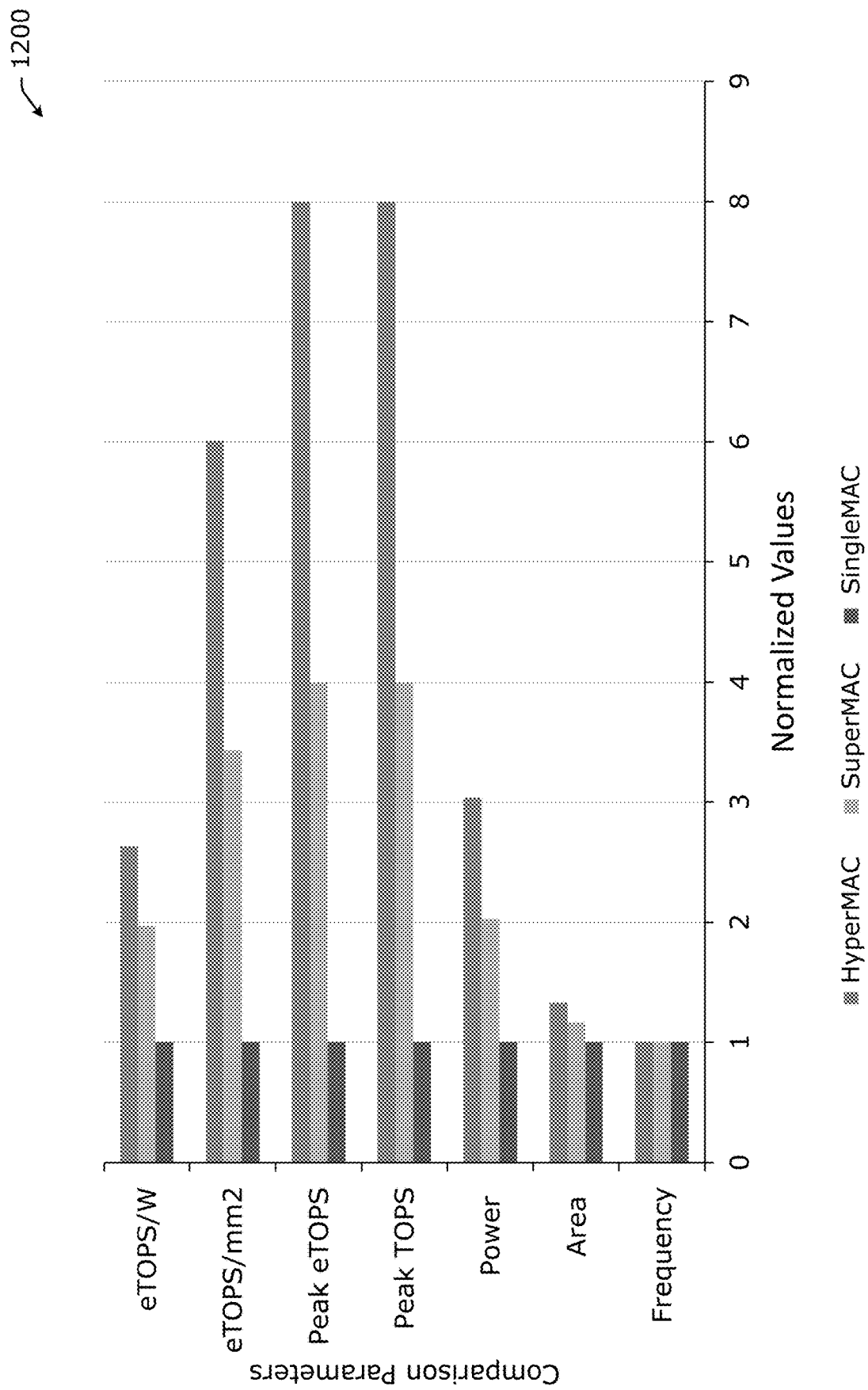
FIG. 12 depicts static MAC scaling simulation results according to various embodiments.

As discussed in more detail with respect to FIG. 12, experimental results show that using static MAC scaling can obtain a peak TOPS improvements in comparison to conventional MAC computational units. In particular, the experimental results show that SuperMAC embodiments (e.g., where M=4) have a TOPS that is four times greater than conventional MACs, and HyperMAC embodiments (e.g., where M=8) have a TOPS that is eight times greater than conventional MACs. These improvements are realized even though the static MAC scaling embodiments only increase the area by a factor of 1.2 for SuperMAC embodiments and a factor of 1.3 for HyperMAC embodiments. Furthermore, the energy consumption of SuperMAC embodiments is only twice as large as the energy consumption of conventional MACs and the energy consumption of HyperMAC embodiments is only three time as large as the energy consumption of conventional MACs. In other words, the static MAC scaling embodiments discussed herein scale up the number of MACs that may be used in a PE 230 while retaining the RF and memory capacities of conventional PEs with a single MAC design, which increases the TOPS/W by a factor of 2 for SuperMAC and by a factor of 2.6 for HyperMAC, and increases the TOPS/mm² by a factor of 3.4 for SuperMAC and by a factor of 6× for HyperMAC. These are significant improvements over the conventional accelerator designs. Most existing accelerator designs increase the number of PEs and the associated components to increase the peak/maximum TOPS. For these existing accelerators, each PE consists of a single MAC, and therefore, increasing the number of PEs by M will increase the TOPS by M, but does not guarantee a corresponding increase in TOPS/mm² and TOPS/W. Instead, increasing the number of PEs in existing accelerators results in the same TOPS/mm² and TOPS/W because increasing the number of PEs also leads to a proportional increase in power consumption (e.g., TOPS/W) and area consumption (e.g., TOPS/mm²).

Static MAC scaling may be used to permanently or temporarily scale up the total number of MACs of hardware accelerators 124. In some implementations, a flexnn_id register within a DNN accelerator 124 is used to permanently store (persistently) whether a PE is using a NormalMAC, SuperMAC, HyperMAC, or UltraMAC. The flexnn_id register and/or the indication of the static MAC scaling type can be represented using a 2-bit register. In implementations where static MAC scaling is used to dynamically switch on and off the total number of MACs within the PE, then internal configuration registers may be programmed to enable the target number of MACs. Aspects of either implementation may be described in the accelerator 124 document and/or datasheet.

static MAC scaling increases and/or scales-up the maximum TOPS, TOPS/W, and TOPS/mm² of an accelerator 124 by increasing the computing logic (e.g., the number of MACs 606) without increasing the RF and buffer capacities that contribute a major portion of the overall area and power consumption. An overview of the static MAC scaling technique is shown by FIG. 7.

FIG. 7 depicts multiple PE arrangements including a standard PE array 701, a standard scaled-up PE array 702, and a static MAC scaling PE array 700 according to various embodiments. Each of the PE arrays 700, 701, and 702 include at least one MAC 606 and RF 608 (although not all MACs 606 and RF 608 are labelled in FIG. 7).

The standard PE array 701 is an N×N PE 230 array where each PE 230 includes a single MAC 606 and a single RF 608. The scaled-up PE array 702 is a scaled-up version of PE array 701, which has been scaled-up according to conventional techniques. The scaled-up PE array 702 is an N×N×M PE 230 array and includes four times the duplication of PE array 701 (e.g., M=4). The scaled-up PE array 702 increases the TOPS by four in comparison with PE array 701, but the TOPS/W and TOPS/mm² remains same as the TOPS/W and TOPS/mm² of PE array 701.

The static MAC scaling microarchitecture 700 comprises an N×N PE 230 array that increases the TOPS, TOPS/W, and TOPS/mm² in comparison with PE array 701. The static MAC scaling microarchitecture 700 increases the number of MACs 606 per PE 230 by M times. In the illustrated example, the size of the PEs 230 in the static MAC scaling microarchitecture 700 is increased only for purposes of clarity, and does not represent the actual size of the PEs 230.

Figure 8:
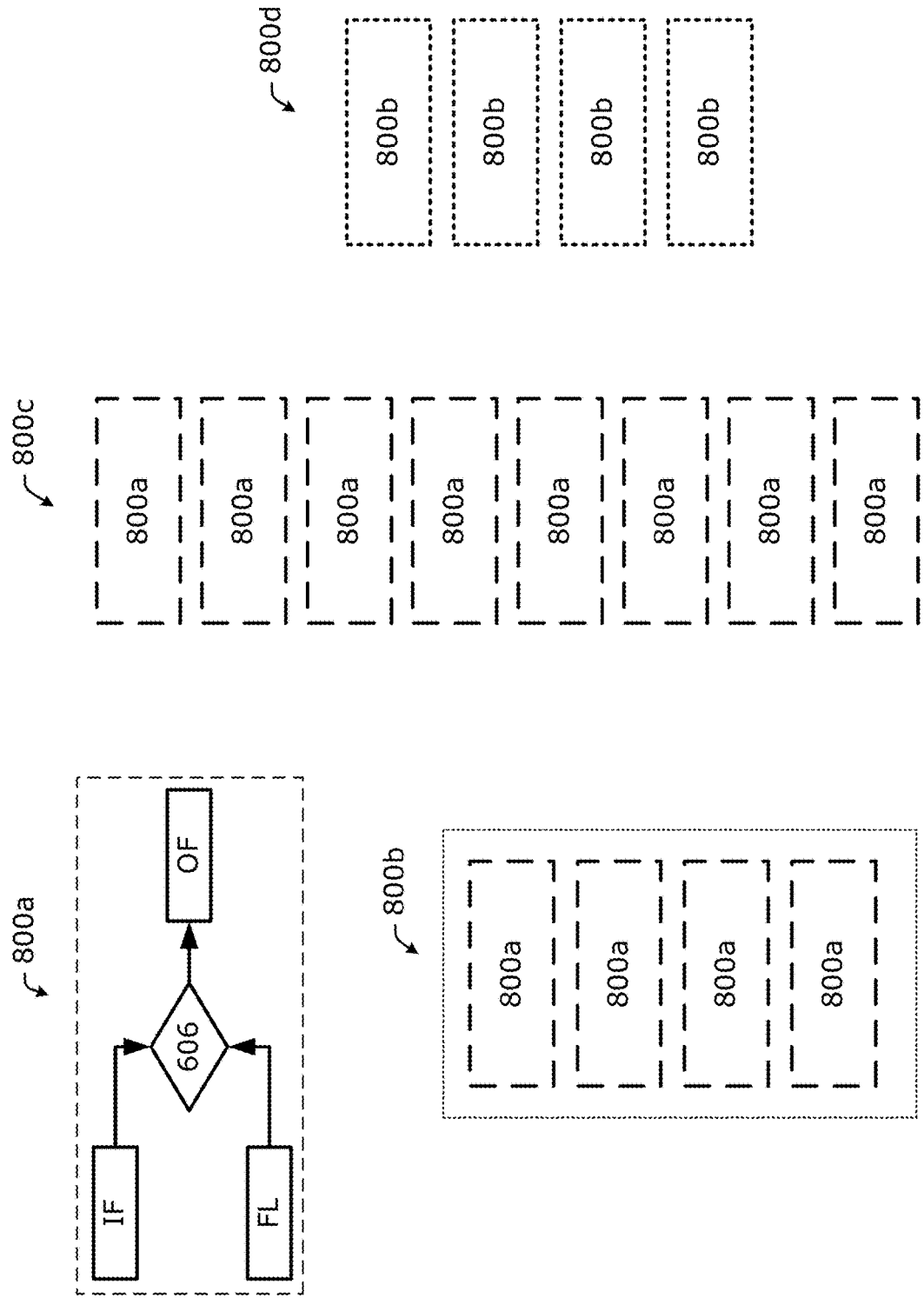
FIG. 8 depicts examples of MAC PE scaling according to various embodiments.

The total number of MACs 606 in each PE 230 is increased by M as shown in FIG. 8. In this case, the total number of MAC operations in the entire PE 230 array increases to M×N². However, since one objective is to increase the peak TOPS (by M times) while also increasing TOPS/W and TOPS/mm², the existing RF and SRAM capacities are shared among the MACs 606 within the PE 230 as shown in FIG. 8. In the example of FIG. 7, M=4, however, in other embodiments, M may be some other number without increasing the size of the internal storage elements.

FIG. 8 shows various example static MAC scaling arrangements according to various embodiments. A first example static MAC scaling arrangement 800a (also referred to as "NormalMAC 800a") includes a single MAC 606 per PE 230. Here, an input activation/input feature map (IF) and weights/filters (FL) are fed into the MAC 606, and the MAC 606 generates an output activations/output feature map (OF). A second example static MAC scaling arrangement 800b (also referred to as "SuperMAC 800b") includes four MACs 606 (e.g., M=4). A third example static MAC scaling arrangement 800c (also referred to as "HyperMAC 800c") includes eight MACs 606 (e.g., M=8) or two SuperMACs 800b. A fourth example static MAC scaling arrangement (also referred to as "UltraMAC 800d") includes sixteen MACs 606 (e.g., M=16), four SuperMACs 800b, or two HyperMACs 800c. In order to increase the RF instances by M times without increasing their respective capacities, the existing single ported IF, FL, and OF RFs 608 are split into M numbers of IF, FL, and OF RFs 608, each having its own read and write ports. In order to keep the total capacity C the same, the capacity of each RF instance 608 is decreased from C to C/M (where C is a number). By keeping the total RF 608 capacity constant, the total area and power increases can be reduced leading to the TOPS/W and TOPS/mm² improvements.

In various embodiments, the load bandwidth and drain bandwidth is also increased by M without increasing the memory (e.g., SRAM) size. This is accomplished using a time-space MUX scheme where the load path is widened to deliver M times the amount of data than would normally be issued over M rounds/iterations in time. In these embodiments, each entry in the column buffer feeds M RF 608 entries for each IF and FL within the PE 230 array. Since there are M IF/FL RFs 608 within each PE 230, and each column buffer entry feeds M RFs 608, the entire column buffer is modified to be M entries wide.

Also as mentioned previously, static MAC scaling supports flexible schedules for data flows. In embodiments, the flexible schedules may be based on different modes of operation. The static MAC scaling modes of operation include a vector-vector (V×V) mode, matrix-vector (M×V) mode, and matrix-matrix (M×M) mode. In some embodiments, these modes of operation may correspond to vector-vector, vector-matrix and matrix-matrix tensor processing templates as discussed in [AC3143]. Examples of these modes of operation for SuperMAC 800b (e.g., static MAC scaling with M=4) are shown by FIGS. 9a and 9b.

Figure 9A:
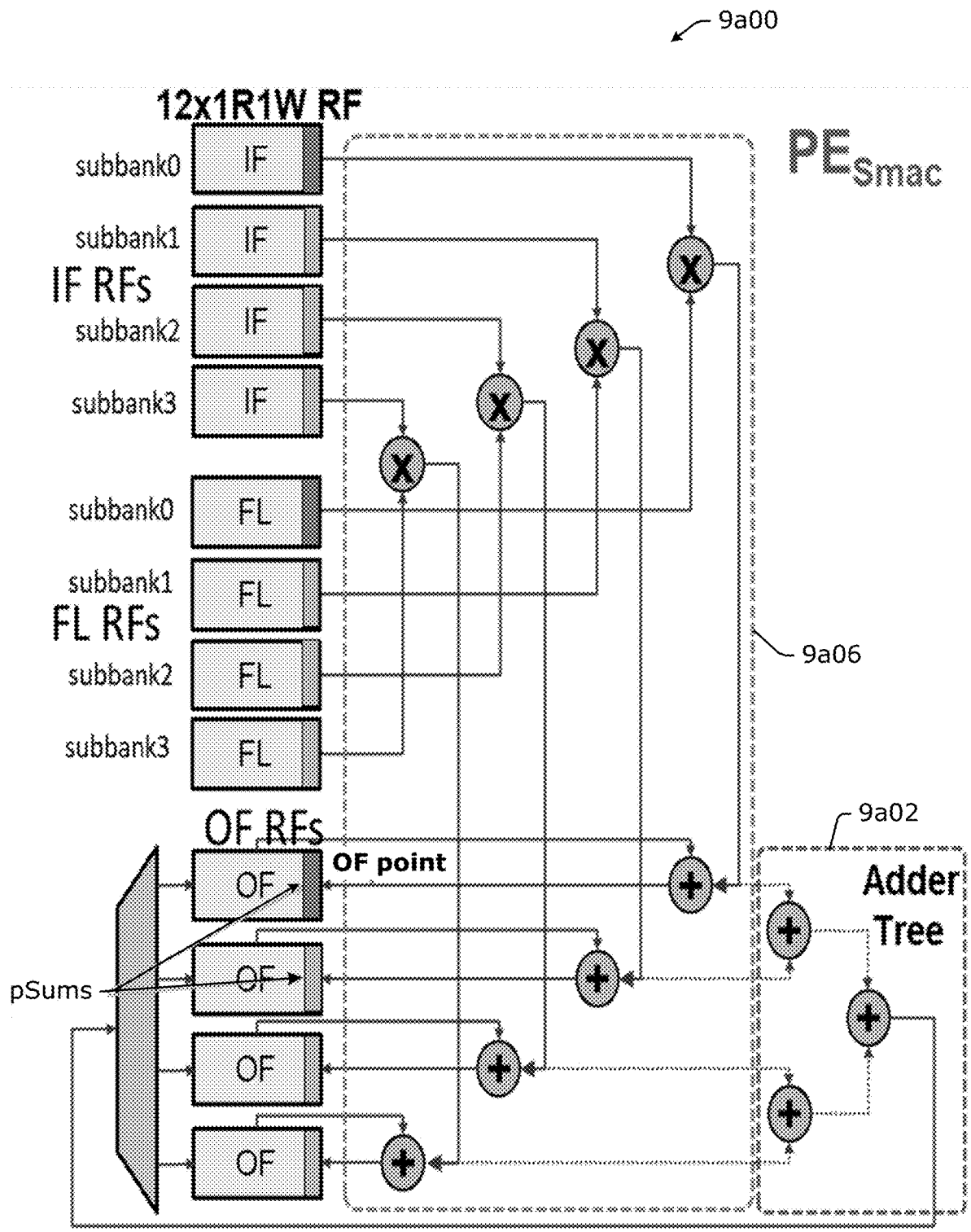
FIGS. 9a and 9b depicts an example SuperMAC PE in a dense mode according to various embodiments.
Figure 9B:
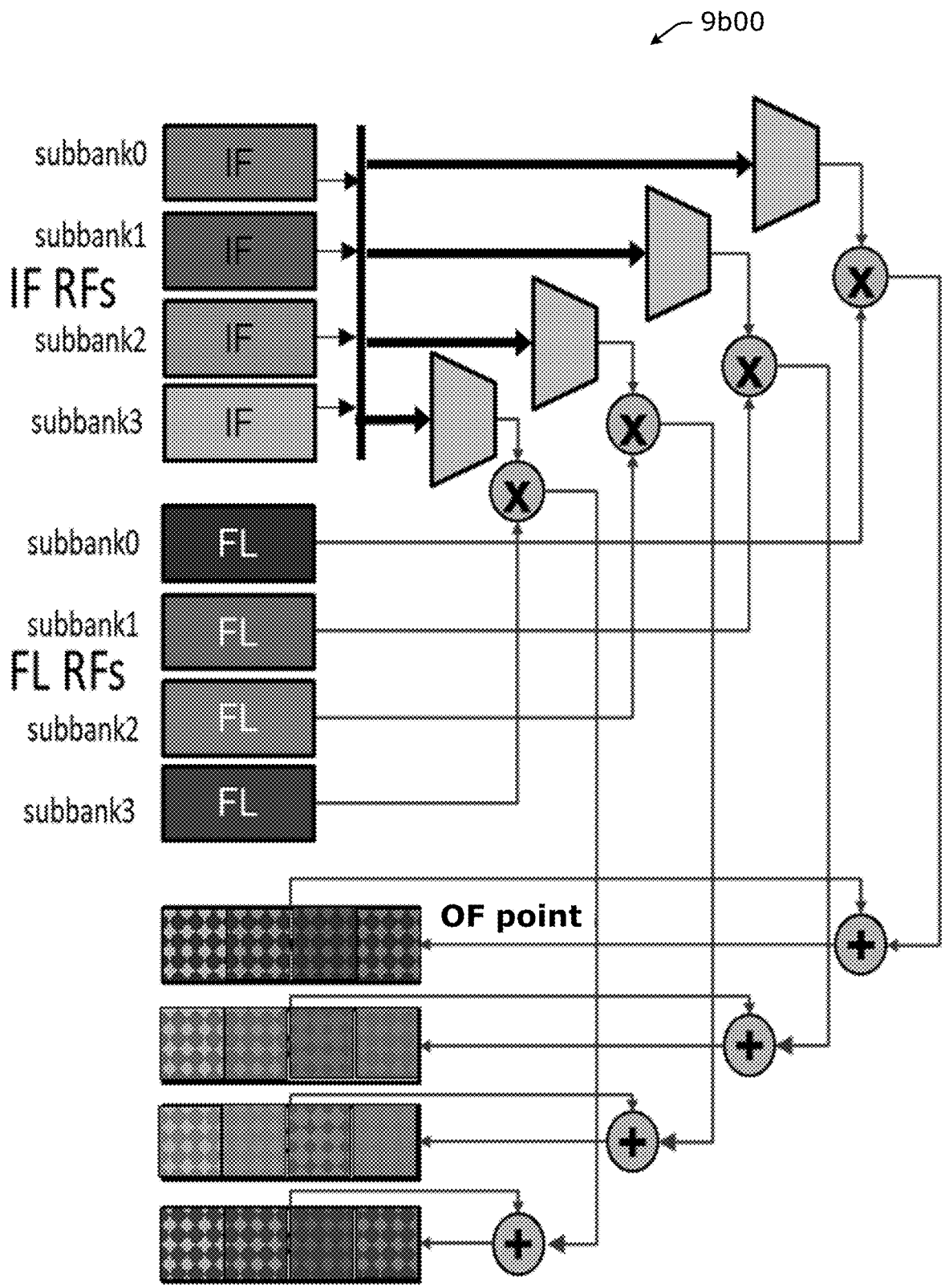

FIGS. 9a and 9b depict SuperMAC microarchitectures 9a00 and 9b00, respectively, according to various embodiments. In particular, FIG. 9a shows a SuperMAC 9a00 (including MAC logic 9a06) working on $I_c$'s belonging to different $I_x/I_y$ and filters belonging to different $O_c$'s (e.g., the matrix-multiplication schedule as in Y. Chen et al., "Using Dataflow to Optimize Energy Efficiency of Deep Neural Network Accelerators," IEEE Micro, vol. 37, no. 3, pp. 12-21 (2017) ("[YChen2]"), and FIG. 9b shows a SuperMAC 9600 working on $I_c$'s belonging to the same $O_c$ (e.g., equal to 4). In these examples, the SuperMACs 9a00 and 9b00 are operating in a dense mode wherein the SuperMAC 9a00 and 9b00 (collectively referred to as "SuperMAC 900") may share some or all of the same IF, FL, and OF RF capacities. The SuperMAC 900 may correspond to the SuperMAC 800b of FIG. 8. Furthermore, each IF in Super- MAC 900 include $I_c$'s from different $I_x/I_y$, and each FL in SuperMAC 900 include $I_c$'s from different $O_c$'s.

A V×V mode of operation is shown in FIG. 9a, where each sub-MAC within a SuperMAC 900 can operate on $I_c$'s belonging to the same $O_c$, but are divided equally among the M sub-RFs 608 where each is operating independently and simultaneously generating M partial sums in the OF RFs 608. Furthermore, an adder tree 9a02 is triggered that takes the M partial sums in the M OF RFs 608 and produces a single OF RF point as shown in both FIGS. 9a and 9b.

An alternate mode of operation is shown in FIG. 9b. This mode of operation involves M MACs 606 working on $I_c$'s belonging to different $I_x$ and/or $I_y$ points and filters belonging to difference $O_c$'s, which is basically an M×M operation. In this mode, the entire PE 230 operation can be subdivided into four sub-rounds. In the first sub-round, the MAC operation occurs between the IF points (i.e., $I_c$ points) of the first $I_x/I_y$ point residing in IF subbank0 and FL points belonging to M different $O_c$'s residing in four FL subbanks, simultaneously. Each $O_c$ is operated in each MAC 606. So, M $O_c$'s are operated in parallel by M MACs 606. Now this gets repeated M times (e.g., for a total of M subrounds) for $I_c$'s belonging to other $Iv/I_y$ points in M different IF RF subbanks as depicted in FIG. 9b.

Figure 10:
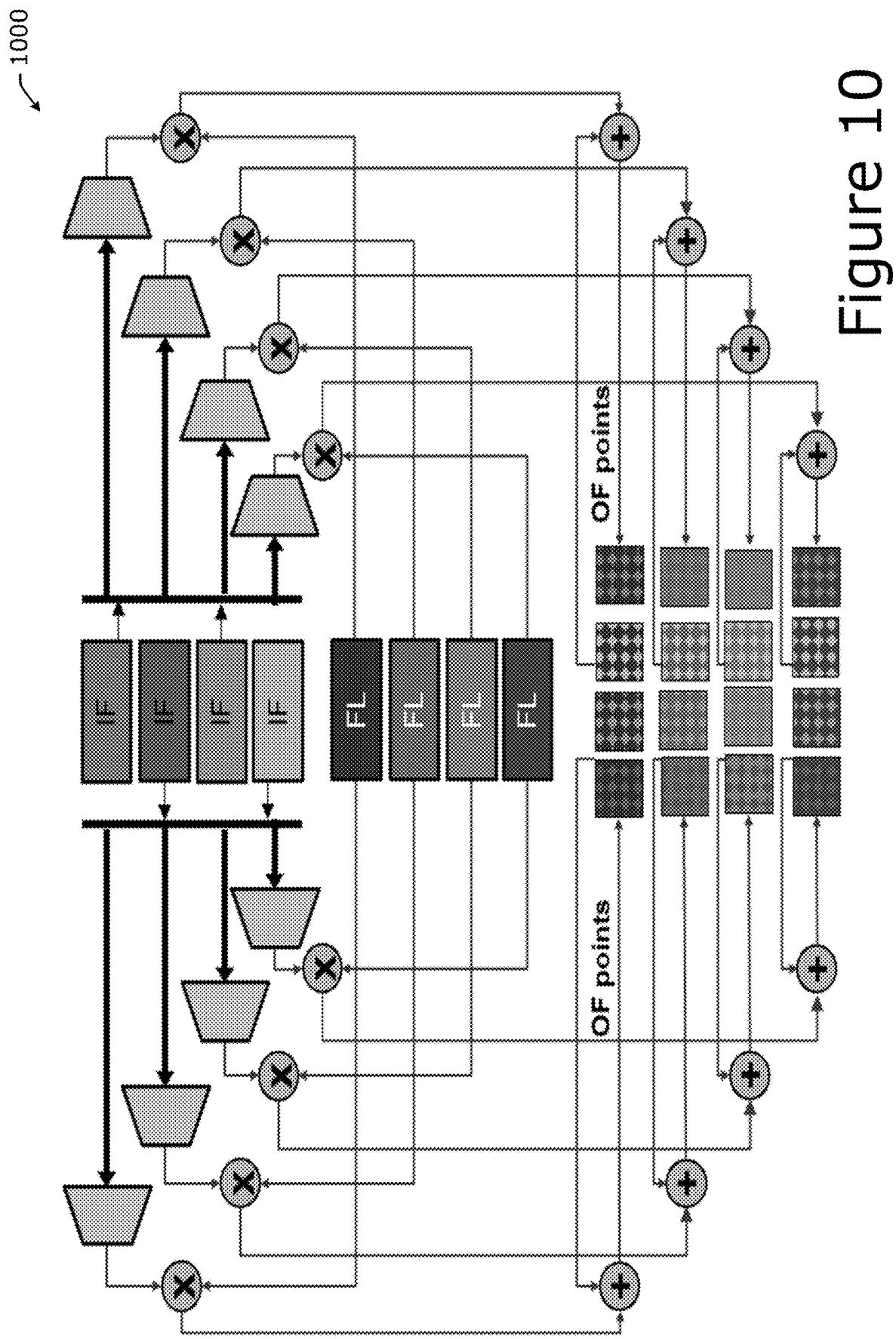
FIG. 10 depicts an example HyperMAC PE in a dense mode according to various embodiments.

According to various embodiments, static MAC scaling may also include scaling MACs from SuperMAC 900 (e.g., M=4) to a HyperMAC 1000 (e.g., M=8), and vice versa. FIG. 10 shows an example of how the number of MACs in a SuperMAC 900 can be increased to a HyperMAC 1000 for further improving the TOPS/W and TOPS/mm² metrics.

FIG. 10 illustrates an example HyperMAC 1000 (e.g., M=8) operating in a dense mode according to various embodiments. In the dense mode, the HyperMAC 1000 may share the same IF, FL, and OF RF capacities, which provides significant benefits in TOPS/W and TOPS/mm². Scaling up from SuperMAC 900 (e.g., M=4) to a HyperMAC 1000 (e.g., M=8) follows the same principle as scaling up from the NormalMAC to the SuperMAC 900. In this example, the number of MACs can be increased without increasing the RF and/or SRAM capacities, and without increasing the load and drain bandwidths. Due to the 4× reuse inside the HyperMAC 1000, it is acceptable to not be load bound since the computations take multiple rounds to complete in the dense mode of operation.

In this example, there are a total of two subrounds. In the first sub-round, a first set of 4 MACs operate on a first set of $I_x$, $I_y$, $I_c$ points residing in IF subbank0 and the FL weights belonging to 4 different $O_c$'s residing in 4 FL subbanks as in the case of SuperMAC 900. In addition, a second set of 4 MACs operate on the second set of $I_x$, $I_y$, $I_c$ points residing in IF subbank1 with the same set of weights belonging to the same 4 $O_c$'s. In other words, the operation performed by the HyperMAC 1000 include two consecutive subrounds of the SuperMAC 900 operation in one HyperMAC 1000 subround by unrolling the two sequential subrounds in space. This may require a 2R2 W OF RF as the two sets of SuperMACs 900 can write two entries in each OF RF subbank. In these embodiments, this may be the minimum overhead that is incurred to scale the number of MACs by 2×.

Furthermore, the examples of FIGS. 9a, 9b, and 10 can also support various modes of operation within the PE 230 while increasing the compute and the bandwidth capacities. For example, the examples of FIGS. 9a, 9b, and 10 can perform matrix-matrix, vector-vector, multiple vector-vector in the same static MAC scaling PE.

Figure 11:
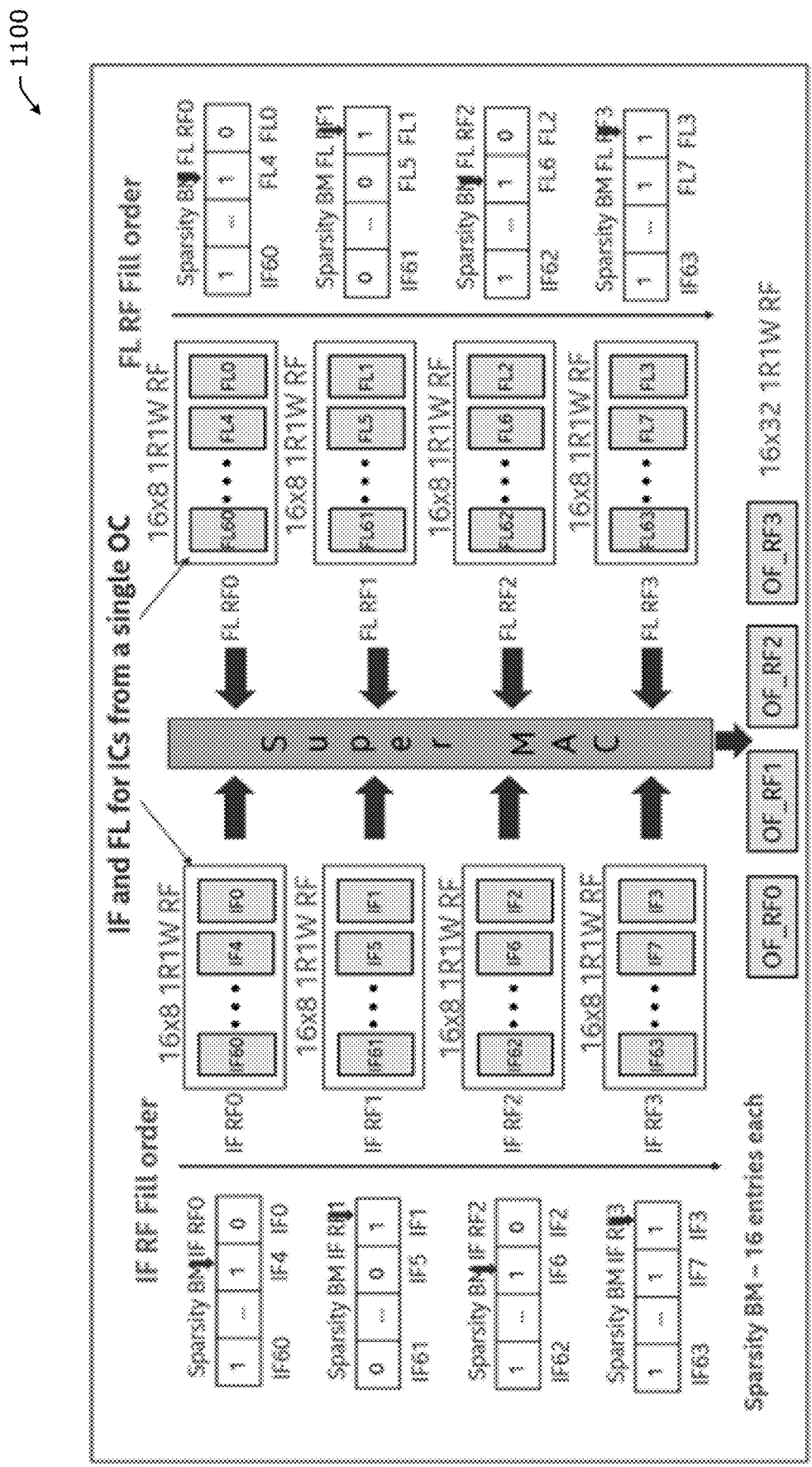
FIG. 11 depicts an example SuperSparseMAC microarchitecture according to various embodiments.

In addition to the aforementioned embodiments, static MAC scaling has the inherent ability to support compute sparsity. In various embodiments, sparsity acceleration may be introduced into a static MAC scaling. As used herein, the term "ScaleSparseMAC" refers to a static MAC scaling with sparsity acceleration. In DNN accelerators 124, sparsity in input data and weights can be exploited for both performance boosts and energy consumption improvement/efficiencies. Compression can be employed due to sparse data to save memory bandwidth and reduce the on-chip SRAM and off-chip DRAM traffic to and from the accelerator 124. Moreover, within the PE 230, sparsity can be exploited to skip 0 operands as 0 has no impact on OF results (e.g., since multiplication and addition by 0 has no impact on the output). FIG. 11 shows an example where zero value compression (ZVC) is used for compressing input data to and from the accelerator. ZVC involves compressing randomly spaced zero values in a data structure and packing the non-zero values together (see e.g., Rhu et al., "Compressing DMA Engine: Leveraging Activation Sparsity for Training Deep Neural Networks", arXiv: 1705.01626v1 [cs.LG] (3 May 2017)).

FIG. 11 illustrates an example SuperSparseMAC microarchitecture 1100 according to various embodiments. The SuperSparseMAC microarchitecture 1100 includes M find-first sparsity acceleration logic for M MACs within a PE 230. The find-first sparsity acceleration logic is used to drive the compute acceleration logic within a particular PE 230 for skipping the compute of zero partial sums inside. In a typical ML accelerator, the PE 230 consists of the MAC 606 as the primary computation module and the IF 681 and FL 682 RFs 608 are used for storing and streaming the inputs to the MAC 606 in a sequential manner. For a sparse ML accelerator, the data in the IF 681 and FL 682 RFs 608 is usually stored in compressed format in input channel (IC) dimension with the accompanying bitmaps stored within dedicated bitmap storage. The find-first logic uses a combination of these two bitmaps (AND) to skip RF 608 values that result in zero partial sums (or MAC 606 multiplications) such that only those IF 681 and FL 682 operands are read from the IF 681 and FL 682 RFs 608 that will result in non-zero partial sums towards the accumulated output. This eliminates any idle cycles during which the MAC 606 is active. In these embodiments, a bitmap (BM) is encoded inline with the compressed data for decoding into dense data. A sparse decoder (not shown by FIG. 11) takes in the bitmap information as well as the optimal schedule aware the MUX selects to divert the correct data within the PE 230. Details of the sparse decoder are discussed in U.S. application Ser. No. 16/832,804 filed on Mar. 27, 2020 ("[AC5200]"), which is hereby incorporated by reference in its entirety. For constructing the ScaleSparseMAC 1100, the sparse decoder may also be increased by M wherein there are M sparse decoders for each column. This helps to retain all the advantages of flexibility, sparsity, and scalability Within each PE 230, the sparsity bitmap is automatically recreated as seen during the load phase using incoming IF and FL wren signals coming from the schedule aware sparse decoders [AC5200]. Subsequently, during the compute phase, the sparsity bitmaps of IF and FL are combined and given as an input to the find-first logic to skip 0 data and gain performance and energy improvements for the entire accelerator system 124. Note that each of the MACs within the SuperSparseMAC has its own find-first sparsity logic independent of each other. As stated previously, the MACs can source the operands either from the M number of IF, FL, and OF RFs 608 based on the optimal schedule. Due to data dependent sparsity, the number of read ports in each IF subbank may need to be increased from 1 to 4 for the M×M mode of operation as each of the subbanks will be independently accessed by 4 rd pointers based on the combined sparsity of data in each IF subbank with 4 different FL subbanks.

RTL Simulation Results:

FIG. 12 includes a graph 1200 showing a comparison of different parameters for simulations of SingleMAC (static MAC scaling with M=1), SuperMAC (static MAC scaling with M=4), and HyperMAC (static MAC scaling with M=8). Simulations were performed using an accelerator 124 with the number of PEs 230 set to 256 and each PE 230 contained M number of MACs where M=1, 4, and 8 for SingleMAC, SuperMAC, and HyperMAC, respectively. These simulations were performed to measure the performance, area, and energy consumption of each static MAC scaling embodiment Table 1 provides a summary of the normalized frequency of operation, area, power consumption, TOPs, eTOPS (corresponding to 50% sparsity), eTOPS/W, eTOPS/mm$^2$ for the SingleMAC, SuperMAC, and HyperMAC simulations when the entire DNN accelerator 124 with 256 PEs 230 were synthesized on an Intel® 10 nm chipset. In Table 1, all the numbers are parameterized with respect to the SingleMAC values. For the simulation, the area included 2 megabytes (MB) of SRAM for both IF and FL operands, the power only includes dynamic power during the compute stage along with the access energies of RF and other intermediate buffers. The latter does not include SRAM access power.

TABLE 1

Normalized synthesis parameters for different static MAC scaling PE implementations

| Parameter | SingleMAC | SuperMAC | HyperMAC |
|---|---|---|---|
| Frequency | 1 | 1.0 | 1.0 |
| Area | 1 | 1.2 | 1.3 |
| Power | 1 | 2.0 | 3.0 |
| Peak TOPS | 1 | 4.0 | 8.0 |
| Peak eTOPS | 1 | 4.0 | 8.0 |
| eTOPS/mm$^2$ | 1 | 3.4 | 6.0 |
| eTOPS/W | 1 | 2.0 | 2.6 |

Graph 1200 of FIG. 12 shows a comparative analysis of the different parameters as represented by Table 1. Graph 1200 shows a peak TOPs increase of 4× and 8× from the SingleMAC to the SuperMAC to the HyperMAC, and the area also increases by only 1.2× and 1.3×, respectively, with increases in energy consumption by 2× and 3×, respectively. However, scaling the compute elements (MAC) according to the various embodiments herein while sharing memory capacities and BW, the TOPS/W goes up by 2×-2.6×, and the TOPS/mm$^2$ rises up by 3.4× and 6×, respectively.

3. Dynamic Mac Scaling Embodiments

As deep neural networks (DNN) continue to evolve at an unprecedented pace trying to meet the growing demand for performing more and more complex tasks, there has been an exponential growth in demand for compute in the hardware DNN accelerators 124 that run these networks. Scaling the amount of compute in hardware while conforming to the power-performance-area (PPA) budgets with each new design generation has proven to be a challenging task. The static MAC scaling techniques discussed previously allow compute capabilities to be scaled by increasing the number of MAC units 606 within individual PEs 230. This approach has been extremely promising in terms of performance/unit area as measured in TOPS/mm$^2$ as well as performance/unit power measured in TOPS/Watt compared to the approach of duplicating the data processing unit itself.

Packing more and more compute capabilities in the form of MACs 606 within a single PE 230 is beneficial for dense mode of computation where a linear scaling in performance can be obtained with a linear increase in number of MACs 606 where the performance of DNN accelerator 124 is compute bound. However, there can be a scenario when a portion of the compute MACs 606 are idle due to high levels of sparsity in activation and weight data limiting the number of effective compute operations. In such scenarios, it is inefficient to be utilizing each MAC 606 in terms of computational resource consumption/overhead.

The present disclosure provides a scheme for dynamic scaling of active MACs 606 (referred to herein as "dynamic MAC scaling") that uses the amount of available sparsity within activation and weight data in real time to decide on whether to turn sections of compute MACs OFF or ON in order to provide optimal TOPS/W.

Existing scaling solutions involve computing N-fold to gain performance in terms of TOPS by merely duplicating the compute units, which is inefficient from a TOPS/W and TOPS/mm$^2$ metrics as mentioned previously. The static MAC scaling embodiments discussed herein provide efficient approach for scaling the TOPS/W and TOPS/mm$^2$ in DNN accelerators 124. However, prior scaling approaches focus on packing more and more compute units (PEs) within the DNN accelerator 124 without addressing the issue of efficient power management expressed in TOPS/W considering scenarios when some of the MACs are idle either due to sparsity in activation and weight data that limits the number of MACs used for effective compute.

The dynamic MAC scaling embodiments dynamically enable or disable sections of compute unit (e.g., individual MACs) to modulate the total number of MACs involved in active compute. The dynamic MAC scaling embodiments use the level of sparsity in activation and weight data to determine whether to enable or disable individual MACs or groups of MACs. dynamic MAC scaling is an on-demand compute resource provisioning scheme based on compute requirements that keeps changing dynamically within DNN accelerators 124. Moreover, a feedback mechanism is used to augment and/or adjust the number of active/enabled MACs within individual PEs. Based on the performance obtained with a fraction of the total number of available MACs, the threshold responsible for turning OFF/ON a portion of total MACs is adjusted if the performance is found to be inferior to an expected level of performance measured in terms of number of clock cycles. This allows a nearly identical level of performance to be maintained as would have been without the number of active MACs modulation scheme.

The dynamic MAC scaling embodiments discussed herein include scaling the number of MACs (e.g., A number of MACs vs. B number of MACs) engaged in active computations based on level of sparsity in activation and weight data in a dynamic manner. The dynamic MAC scaling embodiments also include a Data Sparsity Level Estimator (DSLE) module that adjusts the switching threshold which determines when to use A MACs vs. B MACs based on measurement of sparsity level in data. This allows the DNN accelerator 124 to not lose performance while optimizing for power. The dynamic MAC scaling embodiments also include performance counters that measure the number of cycles while operating either in A or B MACs mode and provide threshold adjustment feedback to the DSLE to maintain an adequate level of performance. This allows the DNN accelerator 124 to avoid under-performing due to turning OFF the MACs when additional MACs are required for computation.

Dynamic MAC scaling uses the level of sparsity in weight data, which is known apriori and is programmed into the weight sparsity descriptors via the compiler. Overall, the dynamic scaling of the number of active MACs 606 belongs to the category of power management techniques that can be optionally turned OFF/ON by software which may be implemented by programming certain register fields. This information can be specified by the relevant product literature, programming guidelines, and/or datasheets. Additionally, the programming of these special register fields could involve additional pins to connect with host processor's control/status registers (CSRs), which may also be specified by the relevant product literature. Some of the heuristics used to adjust the switching threshold based on actual vs. expected cycle count at the output, measured via performance counters may also be specified by the relevant product literature.

Figure 13:
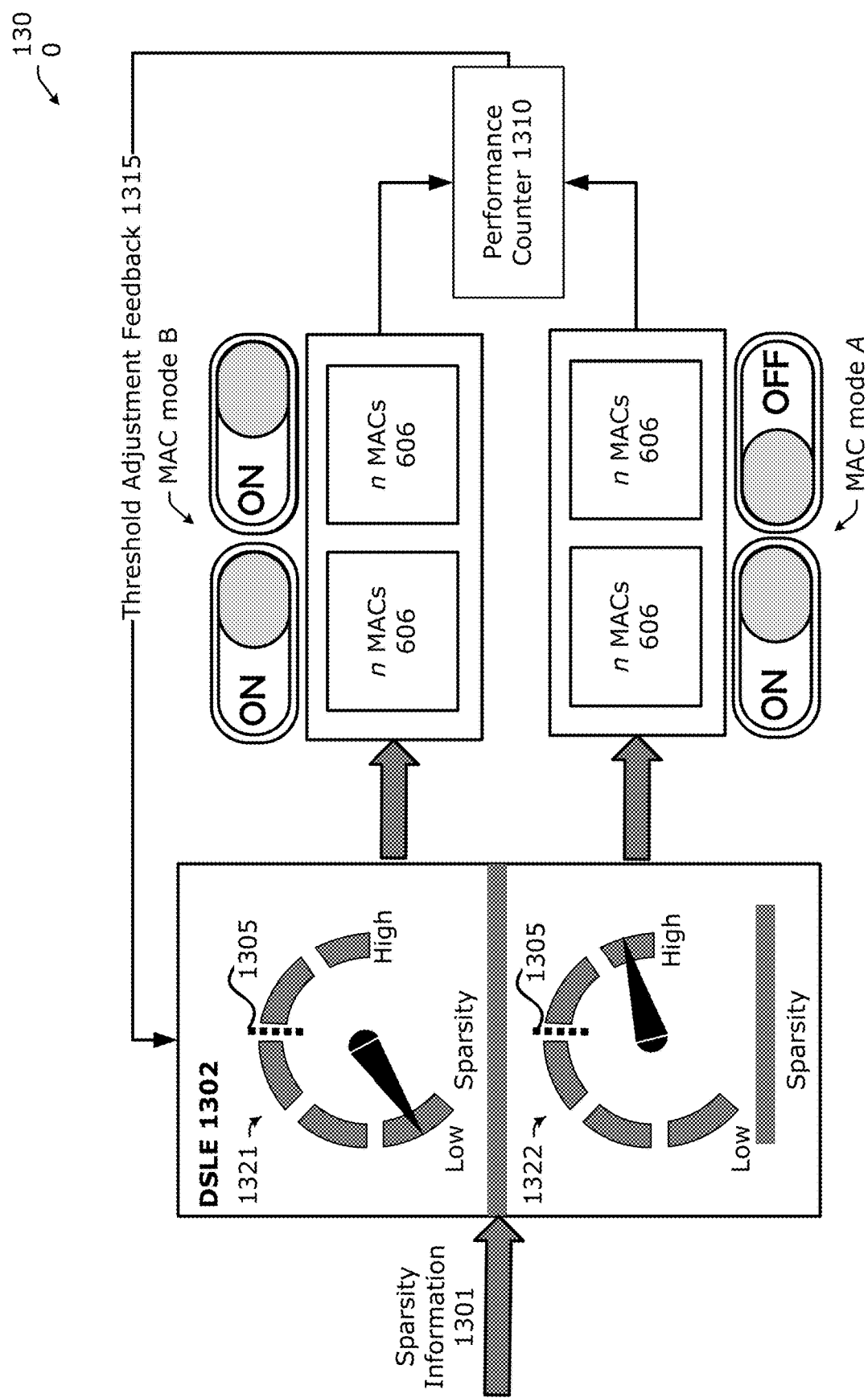
FIG. 13 depicts an example of a dynamic MAC scaling techniques according to various embodiments.

FIG. 13 depicts an example dynamic MAC scaling architecture 1300 according to various embodiments. The dynamic MAC scaling architecture 1300 dynamically scales the number of active MACs based on layer sparsity information 1301 for activations (e.g., the IFs and/or $I_x$, $I_y$, $I_c$ points) and weights (e.g., the FLs and/or $F_x$ and $F_y$ points), which is input to the data sparsity level estimator (DSLE) 1302. The sparsity information 1301 is based on a number of zero values in a matrix, vector, and/or array. In particular, the sparsity information 1301 can be quantified as a score for each of the activations and the weights, which is calculated by dividing the number of zero values in a matrix, vector, or array by the total number of elements in the matrix, vector, or array. The DSLE 1302 may be operated by the accelerator 124 (e.g., by an accelerated function unit (AFU) within the accelerator 124) or a host processor. In DNN accelerators 124 performing inferences, the weights are known apriori, and therefore, the level of sparsity within a particular layer for weights is known upfront. Activations, on the other hand, for a particular layer N are computed by the DNN accelerator 124 itself and are the output of layer N-1 (where N is a number). Only the first layer of activations are provided as an input to the DNN accelerator 124. Since the input activations of layer N is the output activations of layer N-1 generated by the DNN accelerator 124, the amount of sparsity contained within activation data for layer N is calculated by the DNN accelerator 124 itself with minimal overhead and provided as input to the DSLE 1302.

The DSLE 1302 determines whether to dynamically modulate the number of active MACs 606. The decision to dynamically modulate the number of active MACs 606 is derived from the level of sparsity in activation and weights for a particular layer. Table 2 shows the average, upper, and lower combined sparsity levels in activation (ACT) and weight (WT) data.

TABLE 2 example Sparsity Levels

| $ACT_{sparsity}$ | $WT_{sparsity}$ | Avg. Combined$_{sparsity}$ | Upper Comb$_{sparsity}$ | Lower Comb$_{sparsity}$ |
|---|---|---|---|---|
| 0.9 | 0.1 | 0.91 | 1.0 | 0.9 |
| 0.1 | 0.9 | 0.91 | 1.0 | 0.9 |

TABLE 2-continued example Sparsity Levels

| $ACT_{sparsity}$ | $WT_{sparsity}$ | Avg. Combined$_{sparsity}$ | Upper Comb$_{sparsity}$ | Lower Comb$_{sparsity}$ |
|---|---|---|---|---|
| 0.5 | 0.5 | 0.75 | 1.0 | 0.5 |
| 0.9 | 0.9 | 0.99 | 1.0 | 0.9 |
| 0.1 | 0.1 | 0.19 | 0.2 | 0.1 |
| 0.7 | 0.2 | 0.76 | 0.9 | 0.7 |
| 0.3 | 0.6 | 0.75 | 0.9 | 0.6 |

As can be seen in Table 2, the level of combined sparsity can lie within a range of values based on the relative alignment of non-zero values in activations and weights, which is highly data dependent. In some embodiments, the DSLE 1302 utilizes the average combined sparsity values shown in Table 2 compared against a dynamically changing sparsity threshold value 1305 to decide as whether to operate in an A or B MAC mode (where A and B are numbers, which may or may not be the same as one another).

FIG. 13 shows two scenarios for the DSLE 1302 dynamically modulating the number of active MACs 606. In a first scenario 1321 the average combined sparsity, and thus, the achievable sparsity acceleration speedup for the specific sparsity level activation and weight dataset is greater than the current adjustable sparsity threshold 1305. If the average combined sparsity, and thus, the achievable sparsity acceleration speedup for the specific sparsity level activation and weight dataset is greater than the current adjustable sparsity threshold 1305, the DSLE 1302 decides to turn OFF n MACs 606 and chooses to operate in the MAC mode A. In this scenario 1321, the DSLE 1302 enables (or maintains) a first set of n MACs 606 and disables a second set of n MACs 606 (where n is a number). The rationale behind such a decision is in case of sparsity that is greater than a certain threshold value, a certain portion of the total number of active MACs will be idle and can be turned OFF for improved TOPS/W efficiency. In a second scenario 1322 the average combined sparsity, and thus, the achievable sparsity acceleration speedup for the specific sparsity level activation and weight dataset is lower than the current adjustable sparsity threshold 1305. If the average combined sparsity, and thus, the achievable sparsity acceleration speedup is lower than the current adjustable sparsity threshold 1305, the DSLE 1302 decides to turn ON bot sets of n MACs 606 and chooses to operate in the MAC mode B. In this scenario 1322, the DSLE 1302 enables (or maintains) both the first and second sets of n MACs 606.

In one example implementation, each set of n MACs 606 includes 1024 MACs 606 (e.g., n=1K). Additionally or alternatively, MAC mode B may be set as a default mode of operation where the 2K (2048) MACs 606 are active, and the MAC mode A may be a TOPS/W optimized mode wherein enough work is unavailable to keep all the MACs 606 busy, and thus, only 1K (1024) MACs 606 are active. Any other value of n may be used in other embodiments, and the same MAC scaling technique can be applied to any other number of MACs 606 and/or any number of sets of n MACs 606 for achieving improved TOPS/W efficiency.

As mentioned previously, the DSLE 1302 decides based on the average combined sparsity level rather than the actual combined sparsity level which lies between the lower and upper combined sparsity levels and can only be known after actual computation occurs. In such a scenario, there is a chance that the DSLE 1302 can make a wrong prediction to operate in the MAC mode A whereas the actual combined sparsity levels of the DNN accelerator 124 to operate in the MAC mode B to deliver the desired level of performance in terms of number of clock cycles. In order to alleviate this performance issue, a threshold adjust feedback signal 1315 is provided from the output of the MACs 606 to the DSLE 1302. Assuming that the prediction of the DSLE 1302 is correct, then the actual number of cycles to perform compute may be expressed as:

Actual Number of Cycles≤[(1−average combined sparsity)*total number of operations]

Once the MACs 606 perform the actual computation, the actual total number of cycles can be recorded by one or more performance counters 1310 and compared against the expected number of cycles predicted by the DSLE 1302. If the expected number of cycles predicted by the DSLE 1302 is greater than the actual number of cycles recorded within the performance counters after computation by the active MACs 606, then the prediction by DSLE 1302 is accurate and the adjustable switching threshold 1305 is maintained (e.g., not adjusted or updated). However, if the expected number of cycles is lower than the actual number of cycles, it indicates that turning OFF the MACs was an improper decision as the performance measured via number of total clock cycles for compute was adversely impacted. This is corrected by sending the adjust threshold feedback signal 1315 to the DSLE 1302 to update the switching threshold 1305 so that more conservative predictions for reducing the number of active MACs 606 are made in the future. Even though some amount of performance cycles are lost in the current round/iteration, system enters the normal performance mode (e.g., MAC mode B in this example implementation) utilizing all the MACs 606 available to the DNN accelerator 124.

Figure 14:
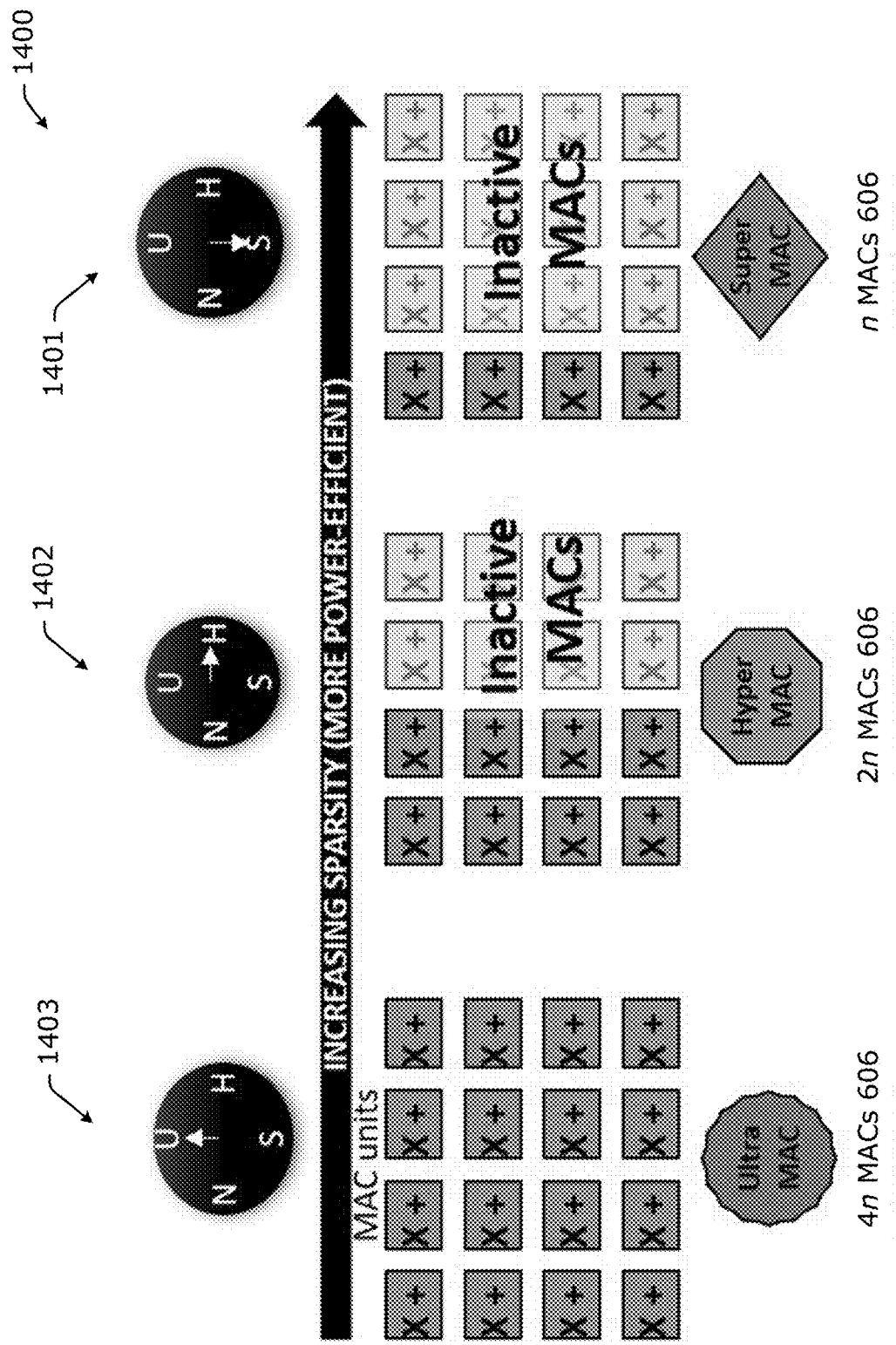
FIG. 14 depicts example extensibility of dynamic MAC scaling techniques according to various embodiments.

FIG. 14 shows the extensibility 1400 of dynamic MAC scaling according to various embodiments. In this example, there are three sets of n MACs 606 including SuperMAC 1401 with n active MACs 606 (which may be the same or similar to SuperMAC 800*b* of FIG. 8), HyperMAC 1402 with 2n active MACs 606 (which may be the same or similar to HyperMAC 800*c* of FIG. 8), and UltraMAC 1403 with 4n active MACs 606 (which may be the same or similar to UltraMAC 800*d* of FIG. 8). When the total number of active MACs 606 grows to 4/1, dynamic MAC scaling can dynamically switch OFF inactive MACs 606 according to increasing levels of sparsity in activation and weight data to be operating either in MAC mode A (e.g., 1n active MACs 606) or MAC mode B (e.g., 2n active MACs 606). In one example, a MAC mode C may be used to indicate that UltraMAC 1403 is enabled. In another example, a MAC mode D may be used to indicate that UltraMAC 1403 is enabled, and a MAC mode C may be used to indicate that the total number of active MACs 606 is 3n (not shown by FIG. 14). In some embodiments, when a minimum amount of sparsity is available to be leveraged within the data (e.g., where all or almost all the MACs 606 are active), an UltraMAC 1403 configuration may be enabled or turned ON, and with gradually increasing sparsity levels when a certain number of the total number of MACs 606 are idle, the HyperMAC 1402 configuration may be enabled for improved TOPS/W performance. Further, when another number of the total number of MACs 606 are idle with even more sparsity in the data, the SuperMAC 1401 configuration may be enabled for improved TOPS/W performance. In some implementations, n=1K MACs 606, however, n may be another other number in other embodiments.

Figure 15:
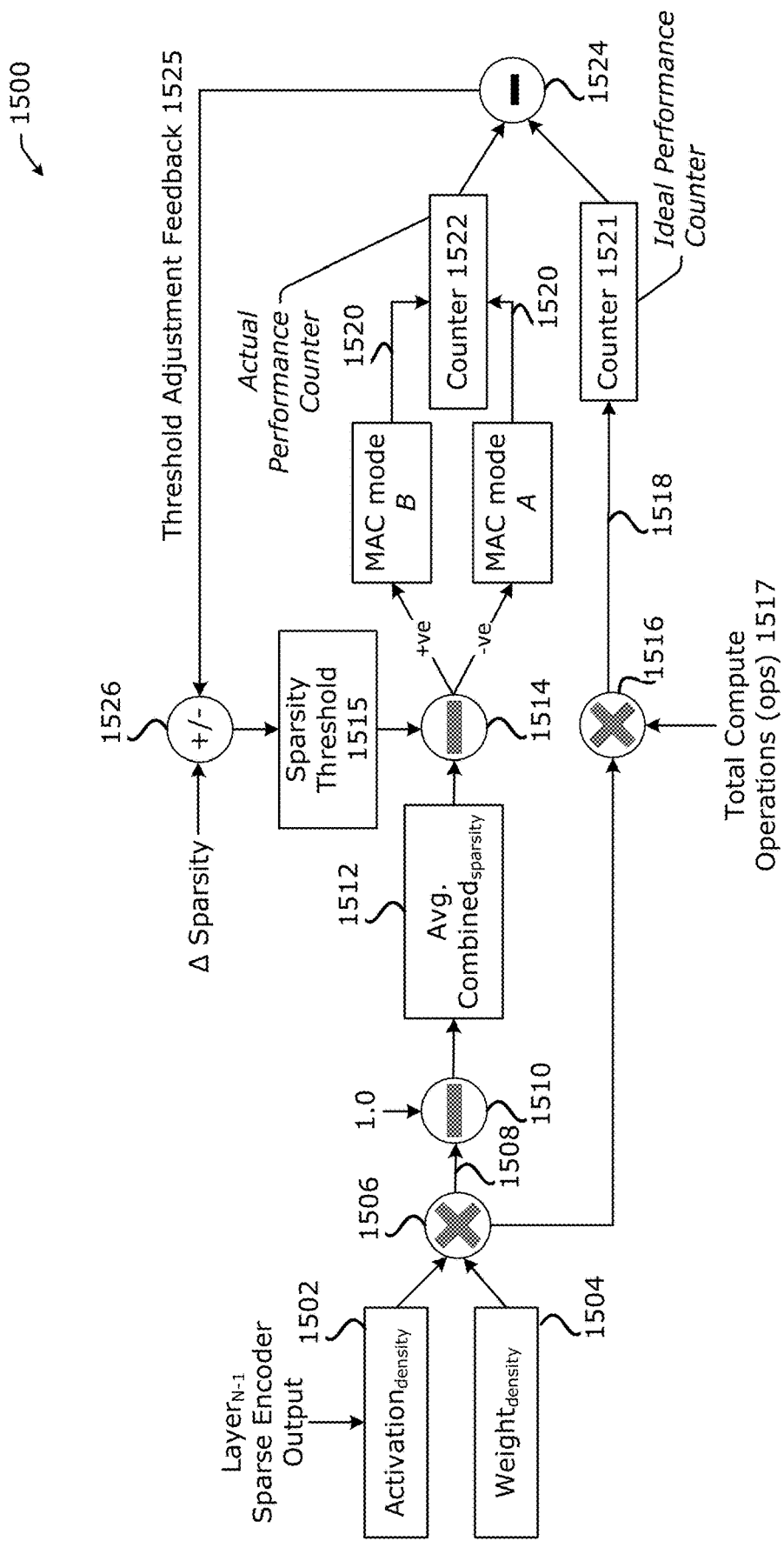
FIG. 15 depicts an example Data Sparsity Level Estimator (DSLE) Module according to various embodiments.

FIG. 15 shows an example implementation of the DSLE 1302 according to various embodiments. In this example, the DSLE 1302 takes the activation density 1502 (which is the sparse encoder output of layer N−1) and the weight density 1504 (which is known apriori) as inputs. The product 1506 of the activation density 1502 and weight density 1504 gives the average combined density 1508 of compute. Subtracting 1510 the average combined density 1508 from one [1−average combined density 1508] yields the average combined sparsity 1512, which is then compared 1514 against the sparsity threshold value 1515. If the average combined sparsity 1512 is less than the sparsity threshold value 1515, the DSLE 1302 enters MAC mode B. If the average combined sparsity 1512 is greater than or equal to the sparsity threshold value 1515, the DSLE 1302 enters MAC mode A by turning OFF a set of n MACs 606. Meanwhile, the product 1516 of the average combined density 1508 of compute and a total compute operations (ops) 1517 (average combined density*total ops) produces an expected number of cycles 1518, which is captured and/or recorded by an ideal performance counter 1521.

At the output of the MACs 606, performance counter(s) 1522 record the actual number of cycles 1520 taken to compute the data. The actual number of cycles 1520 is then compared 1524 against the expected cycles 1518 (average combined density*total ops) stored in the actual counter 1522 and ideal performance counter 1521, respectively. If the expected number of cycles 1518 is greater than the actual number of cycles 1520, then no change is made to the sparsity threshold 1515. If the expected number of cycles 1518 is lower than the actual number of cycles 1520, then the threshold adjust feedback 1525 is used to increase 1526 the value of the sparsity threshold 1515 so that the DSLE 1302 is more conservative in turning OFF the active MACs 606, which impact the performance negatively. Additionally or alternatively, if the expected number of cycles 1518 is greater than or equal to the actual number of cycles 1520, then the threshold adjust feedback 1525 may be used to decrease 1526 the value of the sparsity threshold 1515 so that the DSLE 1302 is less conservative in turning OFF the active MACs 606.

In some implementations, the DSLE 1302 employs two 8-bit multipliers (e.g., operators 1506 and 1516), one for the average combined density (e.g., operator 1506) and another for ideal cycles computation (e.g., operator 1516) for storage in performance counters 1521 and 1522. Additionally, in some implementations four 8-bit subtractors (e.g., operators 1510, 1514, 1524, and/or 1526) along with one or more multi-bit registers to store the results. In some implementations, the counters 1521 and 1522 may be employed as the multi-bit registers or additional registers separate from the counters 1521 and 1522 may be used. The overall impact regarding hardware overhead is negligible (e.g., <1%) compared to the overall DNN accelerator hardware 124.

Figure 16:
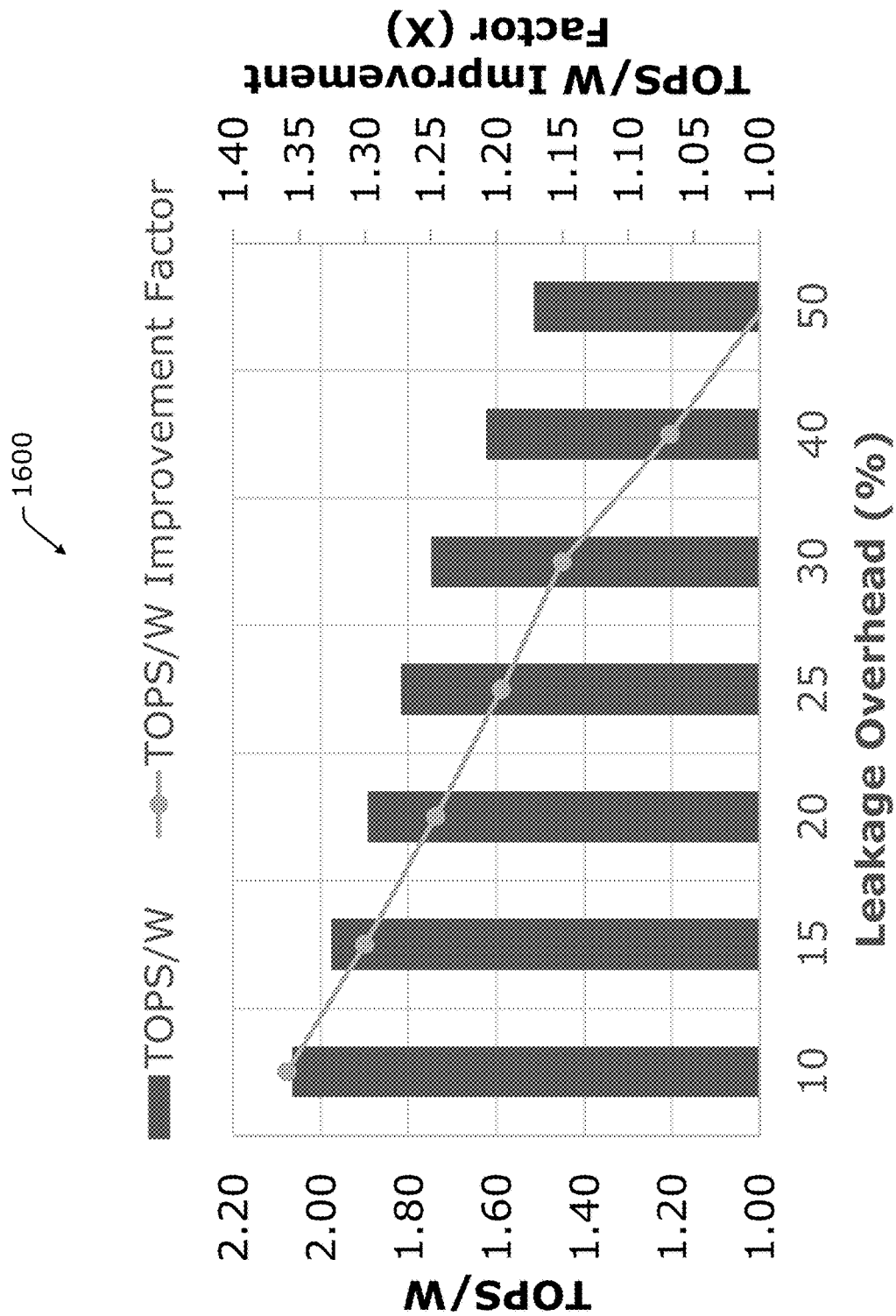
FIG. 16 depicts dynamic MAC scaling simulation results according to various embodiments.

FIG. 16 includes a graph 1600 showing TOPS/W and TOPS/W Improvement Factor vs. Leakage Overhead (%) for the dynamic MAC scaling embodiments discussed herein. Graph 1600 shows the TOPS/W as well as the improvement in TOPS/W metric achieved in simulations using dynamic MAC scaling over a baseline simulation that does not employ dynamic MAC scaling. The x-axis of graph 1600 shows leakage overhead associated with turning OFF the n MACs 606 expressed as a fraction of the power consumed by the n active MACs 606 with TOPS/W and the improvement in TOPS/W factor being plotted on the y-axis. In these simulations, n=1K. It can be observed that the dynamic MAC scaling scheme results in up to 36% improvement in TOPS/W for leakage overhead of 10% when the n MACs 606 are turned OFF. It can be observed that as the leakage associated with the turned OFF MACs 606 increases to about 50% of the power of the active MACs 606, the TOPS/W of the n active MACs 606 approaches that of the baseline where dynamic active MAC 606 scaling is not used. The absolute crossover point will be different for the total numbers of MACs 606 different from 2n.

Figure 17:
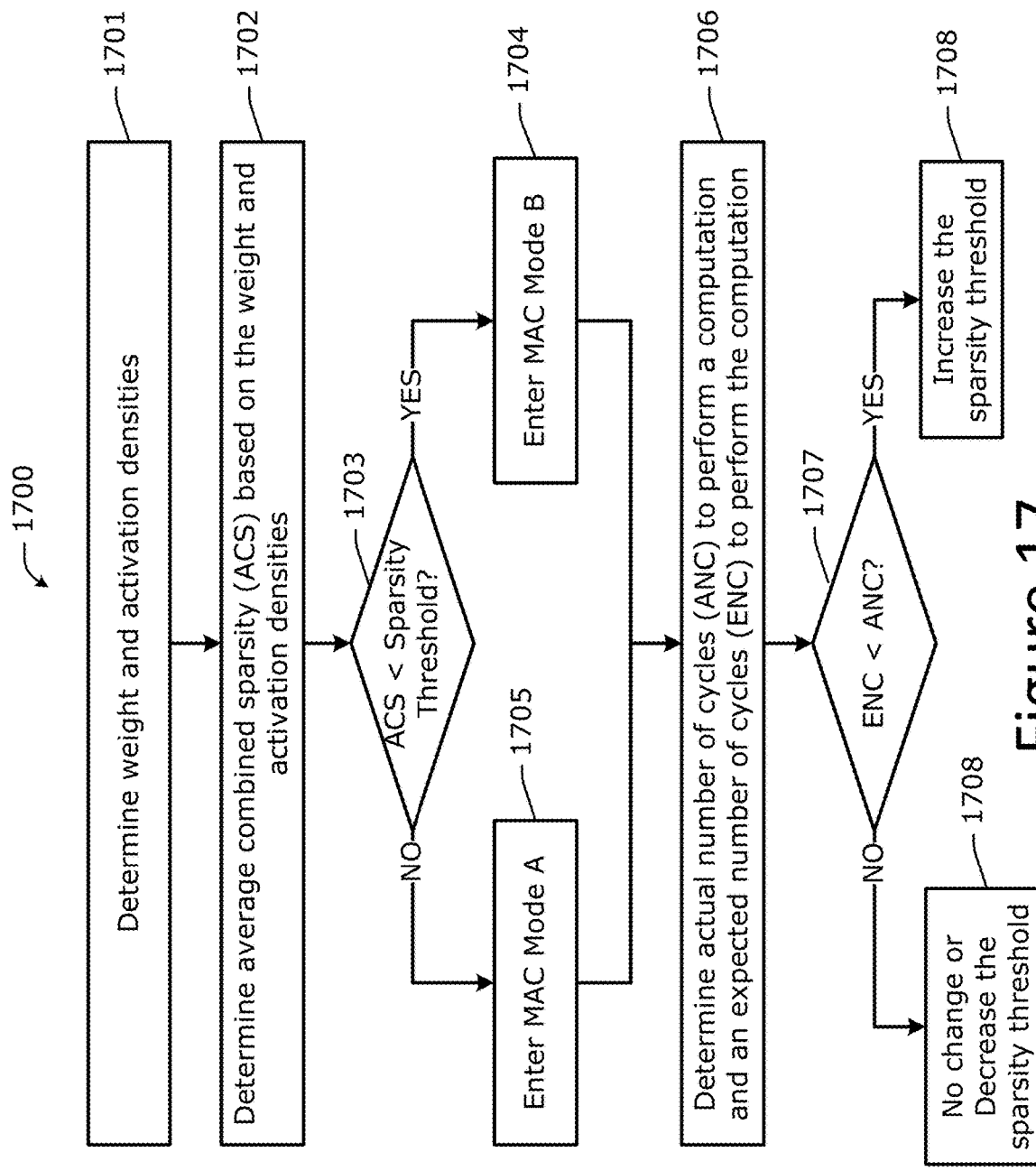
FIG. 17 illustrates an example processes for practicing various embodiments discussed herein.

FIG. 17 illustrates an example process 1700 for practicing the dynamic MAC scaling embodiments discussed herein. Process 1700 may be operated by the DSLE 1302. Process 1700 begins at operation 1701 where the DSLE 1302 determines weight and activation densities. The weight density is known apriori. And the activation density may be obtained from a sparse encoder output. At operation 1702, the DSLE 1302 determines an average combined sparsity (ACS) of the weights and activation by determining an average combined density based on a product of the activation density and the weight density and subtracting ene from the average combined density from one.

At operation 1702, the DSLE 1302 determines whether the ACS is less than a sparsity threshold. If the ACS is less than the sparsity threshold value, the DSLE 1302 proceeds to operation 1704 to enter MAC mode B. In some embodiments, MAC mode B involves taking no action, while in other embodiments, MAC mode B involves activating n MACs. If the average combined sparsity is greater than or equal to the sparsity threshold value, the DSLE 1302 proceeds to operation 1705 to enter MAC mode A. In some embodiments, MAC mode A involves deactivating a set of n MACs.

After operation 1704 or operation 1705, the DSLE 1302 proceeds to operation 1706 determine an actual number of cycles (ANC) taken to perform a computation by activated ones of the plurality of MACs; and determine an expected number of cycles (ENC) to perform the computation based on the average combined density and a number of operations for performing the computation. Respective performance counters may be used to track the ANC and the ENC. At operation 1707, the DSLE 1302 determines whether the ENC is less than the ANC. If the ENC is less than the ANC, then the DSLE 1302 proceeds to operation 1708 to increase the sparsity threshold value. If the ENC is not less than the ANC, then the DSLE 1302 proceeds to operation 1709 to either decrease the sparsity threshold value or not change the sparsity threshold value. The sparsity threshold value may be adjusted by determining an amount to adjust the sparsity threshold value based on the comparison of the ENC with the ANC; generating a threshold adjustment feedback signal to include the amount; and sending the threshold adjustment feedback signal to an operator/computational unit that is configured to adjust the sparsity threshold value. After performance of operation 1708 or operation 1709, process 1700 may end or repeat as necessary.

4. Example Hardware Configurations and Arrangements

Figure 18:
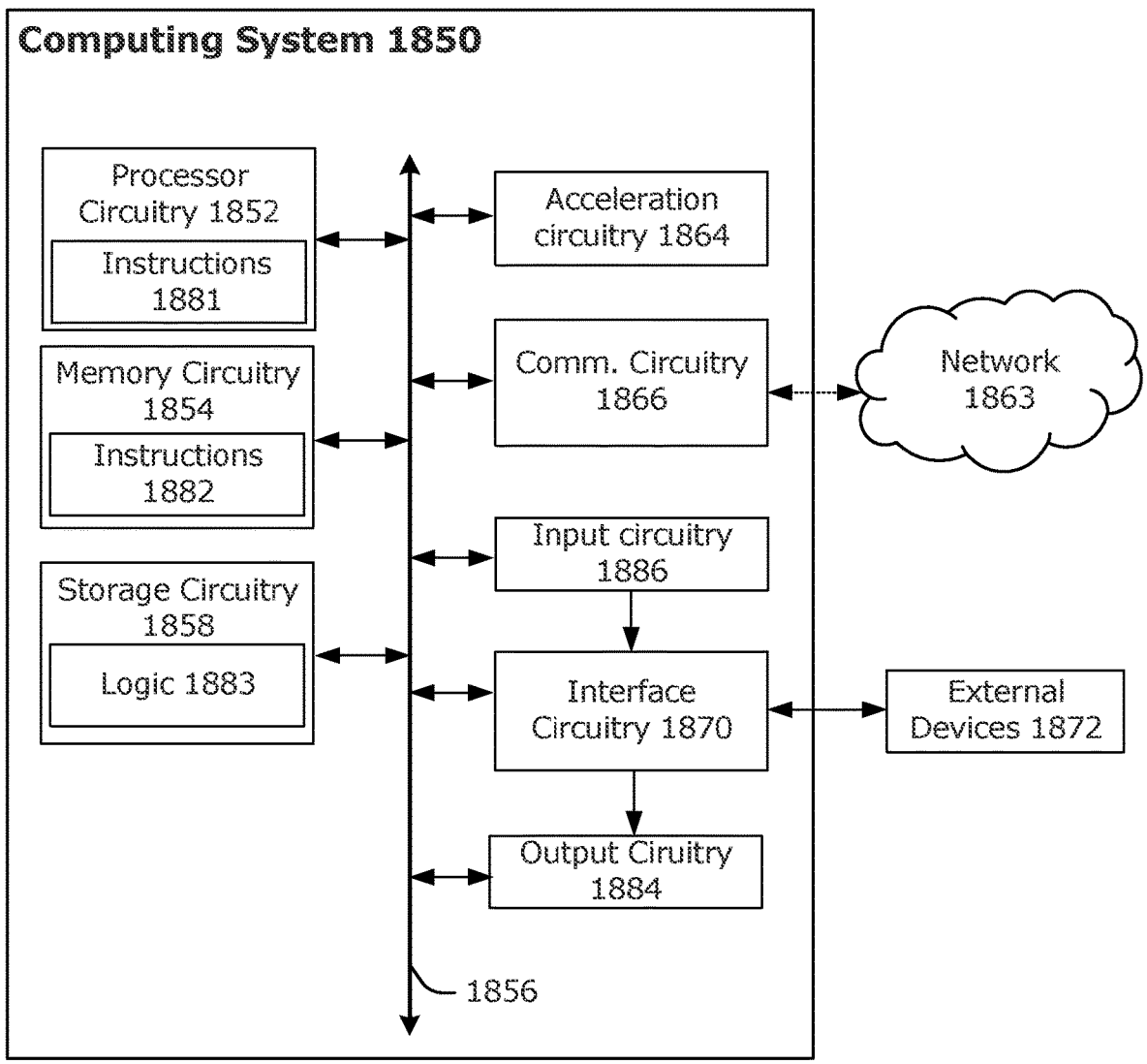
FIG. 18 illustrates an example components of a computing system(s) according to various embodiments.

FIG. 18 illustrates an example of components that may be present in a computing system 1850 for implementing the techniques (e.g., operations, processes, methods, and methodologies) described herein. The computing system 1850 provides a closer view of the respective components of node when implemented as or as part of a computing device (e.g., as a mobile device, a base station, server, gateway, etc.). The computing system 1850 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerator(s) 124, software, firmware, or a combination thereof adapted in the computing system 1850, or as components otherwise incorporated within a chassis of a larger system. For one embodiment, at least one processor 1852 may be packaged together with logic 1883 and configured to practice aspects of various example embodiments described herein to form a System in Package (SiP) or a System on Chip (SoC).

The system 1850 includes processor circuitry in the form of one or more processors 1852. The processor circuitry 1852 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1852 may include one or more hardware accelerators 124 (e.g., same or similar to acceleration circuitry 1864), which may be microprocessors, programmable processing devices (e.g., FPGA, ASIC, etc.), or the like. The one or more accelerators 124 may include, for example, computer vision, deep learning, and/or any other specifically-designed/tailored accelerators 124. In some implementations, the processor circuitry 1852 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1852 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) may be coupled with or may include memory/storage and may be configured to execute instructions stored in the memory/storage to enable various applications or operating systems to run on the computing system 1850. The processors (or cores) may be configured to operate application software to provide a specific service to a user of the computing system 1850. In some embodiments, the processor(s) may be a special-purpose processor(s)/controller(s) configured (or configurable) to operate according to the various embodiments herein.

As examples, the processor circuitry 1852 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) processor circuitry 1852 may be a part of a system on a chip (SoC), System-in-Package (SiP), a multi-chip package (MCP), and/or the like, in which the processer(s) processor circuitry 1852 and other components are formed into a single integrated circuit, or a single package, such as the Edison™ or Galileo™ SoC boards from Intel® Corporation. Other examples of the processer(s) processor circuitry 1852 are mentioned elsewhere in the present disclosure.

The system 1850 may include or be coupled to acceleration circuitry 1864, which may be embodied by one or more AI/ML accelerators 124, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, and/or the like.

In FPGA-based implementations, the acceleration circuitry 1864 may comprise logic blocks or logic fabric and other interconnected resources that may be programmed (configured) to perform various functions, such as the procedures, methods, functions, etc. of the various embodiments discussed herein. In such implementations, the acceleration circuitry 1864 may also include memory cells (e.g., EPROM, EEPROM, flash memory, static memory (e.g., SRAM, anti-fuses, etc.) used to store logic blocks, logic fabric, data, etc. in LUTs and the like. In some implementations, the acceleration circuitry 1864 may have a spatial architecture 2a00 and 2b00 of FIGS. 2a and 2b.

In some implementations, the processor circuitry 1852 and/or acceleration circuitry 1864 may include hardware elements specifically tailored for machine learning functionality, such as for operating the static MAC scaling and dynamic MAC scaling embodiments discussed herein. In these implementations, the processor circuitry 1852 and/or acceleration circuitry 1864 may be, or may include, an AI engine chip that can run many different kinds of AI instruction sets once loaded with the appropriate weightings and training code. Additionally or alternatively, the processor circuitry 1852 and/or acceleration circuitry 1864 may be, or may include, AI accelerator(s), which may be one or more of the aforementioned hardware accelerators 124 designed for hardware acceleration of AI applications. As examples, these processor(s) or accelerators 124 may be a cluster of artificial intelligence (AI) GPUs, tensor processing units (TPUs) developed by Google® Inc., Real AI Processors (RAPS™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 1852 and/or acceleration circuitry 1864 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

The system 1850 also includes system memory 1854. Any number of memory devices may be used to provide for a given amount of system memory. As examples, the memory 1854 may be, or include, volatile memory such as random access memory (RAM), SRAM, dynamic RAM (DRAM), synchronous DRAM (SDRAM), RAMBUS® Dynamic Random Access Memory (RDRAM®), and/or any other desired type of volatile memory device. Additionally or alternatively, the memory 1854 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 1854 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 1858 provides persistent storage of information such as data, applications, operating systems and so forth. In an example, the storage 1858 may be implemented via a solid-state disk drive (SSDD) and/or high-speed electrically erasable memory (commonly referred to as "flash memory"). Other devices that may be used for the storage 1858 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 1854 and/or storage circuitry 1858 may also incorporate three-dimensional (3D) cross-point (XPOINT) memories from Intel® and Micron®.

The memory circuitry 1854 and/or storage circuitry 1858 is/are configured to store logic 1883 in the form of software, firmware, microcode, or hardware-level instructions to implement the techniques described herein. The logic 1883 may be employed to store working copies and/or permanent copies of programming instructions, or data to create the programming instructions, for the operation of various components of computing system 1850 (e.g., drivers, libraries, application programming interfaces (APIs), etc.), an operating system of computing system 1850, one or more applications, and/or for carrying out the embodiments discussed herein. The logic 1883 may be stored or loaded into memory circuitry 1854 as instructions 1882, or data to create the instructions 1882, which are then accessed for execution by the processor circuitry 1852 to carry out the functions described herein. The processor circuitry 1852 and/or the acceleration circuitry 1864 accesses the memory circuitry 1854 and/or the storage circuitry 1858 over the IX 1856. The instructions 1882 direct the processor circuitry 1852 to perform a specific sequence or flow of actions, for example, as described with respect to flowchart(s) and block diagram(s) of operations and functionality depicted previously. The various elements may be implemented by assembler instructions supported by processor circuitry 1852 or high-level languages that may be compiled into instructions 1881, or data to create the instructions 1881, to be executed by the processor circuitry 1852. The permanent copy of the programming instructions may be placed into persistent storage devices of storage circuitry 1858 in the factory or in the field through, for example, a distribution medium (not shown), through a communication interface (e.g., from a distribution server (not shown)), over-the-air (OTA), or any combination thereof.

The IX 1856 couples the processor 1852 to communication circuitry 1866 for communications with other devices, such as a remote server (not shown) and the like. The communication circuitry 1866 is a hardware element, or collection of hardware elements, used to communicate over one or more networks 1863 and/or with other devices. In one example, communication circuitry 1866 is, or includes, transceiver circuitry configured to enable wireless communications using any number of frequencies and protocols such as, for example, the Institute of Electrical and Electronics Engineers (IEEE) 802.11 (and/or variants thereof), IEEE 802.15.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 1866 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others. In some embodiments, the communication circuitry 1866 may include or otherwise be coupled with the acceleration circuitry 1864, as described previously, in accordance with various embodiments.

The IX 1856 also couples the processor 1852 to interface circuitry 1870 that is used to connect system 1850 with one or more external devices 1872. The external devices 1872 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 1850, which are referred to as input circuitry 1886 and output circuitry 1884 in FIG. 18. The input circuitry 1886 and output circuitry 1884 include one or more user interfaces designed to enable user interaction with the computing system 1850 and/or peripheral component interfaces designed to enable peripheral component interaction with the computing system 1850. Input circuitry 1886 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1884 may be included to show information or otherwise convey information, such as sensor readings, actuator position(s), or other like information. Data and/or graphics may be displayed on one or more user interface components of the output circuitry 1884. Output circuitry 1884 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the computing system 1850. The output circuitry 1884 may also include speakers and/or other audio emitting devices, printer(s), and/or the like. Additionally or alternatively, sensor(s) may be used as the input circuitry 1886 (e.g., an image capture device, motion capture device, or the like) and one or more actuators may be used as the output device circuitry 1884 (e.g., an actuator to provide haptic feedback or the like). Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 1850 may communicate over the interconnect (IX) 1856. The IX 1856 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 1856 may be a proprietary bus, for example, used in a SoC based system.

The number, capability, and/or capacity of the elements of computing system 1850 may vary, depending on whether computing system 1850 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing system 1850 may comprise one or more components of a data center, a desktop computer, a workstation, a laptop, a smartphone, a tablet, a digital camera, a smart appliance, a smart home hub, a network appliance, and/or any other device/system that processes data.

5. Example Implementations

Additional examples of the presently described embodiments include the following, non-limiting example implementations. Each of the following non-limiting examples may stand on its own or may be combined in any permutation or combination with any one or more of the other examples provided below or throughout the present disclosure.

Example 1 includes a method of operating an accelerator integrated circuit (AIC), the method comprising: defining an array of processing elements (PEs); and defining each PE of the array of PEs to include a corresponding plurality of multiply-and-accumulate units (MACs) and a corresponding register file (RF) split into a plurality of RF instances.

Example 2 includes the method of example 1 and/or some other example(s) herein, wherein each RF instance of the corresponding plurality of RF instances has its own read and write ports.

Example 3 includes the method of examples 1-2 and/or some other example(s) herein, wherein a number of RF instances of the corresponding plurality of RF instances is equal to a number of MACs of the corresponding plurality of MACs.

Example 4 includes the method of example 3 and/or some other example(s) herein, wherein the AIC comprises a set of column buffers, wherein each column buffer of the set of column buffers is associated with a column of PEs in the PE array, and each column buffer comprises a number of entries equal to the number of RF instances.

Example 5 includes the method of example 4 and/or some other example(s) herein, further comprising: implementing a time-space multiplexing scheme to deliver a number of data units over a load path to each PE of the plurality of PEs, wherein the number of data units is equal to the number of entries of each column buffer.

Example 6 includes the method of examples 1-5 and/or some other example(s) herein, wherein each RF of the corresponding plurality of RF instances includes a respective input feature map (IF) and respective filters (FL), and the method comprises: feeding the respective IFs and the respective FLs into a corresponding MAC of the corresponding plurality of MACs; and causing the corresponding MAC to generate a respective output feature maps (OF) based on the respective IFs and the respective FLs.

Example 6a includes the method of examples 1-6 and/or some other example(s) herein, wherein each RF of the corresponding plurality of RF instances includes a respective input feature map (IF) and respective filters (FL), wherein the respective IF and the respective FL are to be fed into a corresponding MAC of the corresponding plurality of MACs, and the corresponding MAC generates a respective output feature map (OF) based on the IF and the FL.

Example 7 includes the method of example 6-6a and/or some other example(s) herein, further comprising: causing each MAC of the corresponding plurality of MACs to operate on respective IFs and respective FLs that belong to a same OF to generate respective partial sums (pSums) in respective OFs independently and simultaneously as each other MAC of the corresponding plurality of MACs.

Example 7a includes the method of example 6, 6a, 7, and/or some other example(s) herein, wherein each MAC of the corresponding plurality of MACs is configured to operate on respective IFs and respective FLs to generate respective partial sums (pSums) in respective OFs, wherein each MAC is to operate independent from and simultaneously with each other MAC of the corresponding plurality of MACs Example 8 includes the method of example 7-7a and/or some other example(s) herein, wherein each PE further comprises an adder tree, and the method comprises operating the adder tree to obtain the respective pSums from the respective OFs and generate a single OF point.

Example 9 includes the method of example 6-6a and/or some other example(s) herein, further comprising: causing each MAC of the corresponding plurality of MACs to operate on IF points of the respective IFs residing in respective IF subbanks and FL points belonging to multiple different OCs residing in multiple FL subbanks, simultaneously.

Example 9a includes the method of examples 6-6a and/or some other example(s) herein, wherein each MAC of the corresponding plurality of MACs is configured to simultaneously operate on: IF points of the respective IFs residing in respective IF subbanks, and FL points belonging to multiple different OCs residing in multiple FL subbanks.

Example 10 includes the method of example 9 and/or some other example(s) herein, further comprising: causing each MAC of the corresponding plurality of MACs to operate on corresponding OCs residing within each MAC in parallel, and repeat operation on the respective IFs a predefined number of times.

Example 11 includes the method of examples 6-10 and/or some other example(s) herein, further comprising: receiving, by a data sparsity level estimator (DSLE), sparsity information for the respective IFs and the respective FLs; determining, by the DSLE, an average combined sparsity values based on the sparsity information; and activating or deactivating, by the DSLE, one or more MACs of the corresponding plurality of MACs within each PE of the plurality of PEs.

Example 12 includes the method of examples 1-11 and/or some other example(s) herein, further comprising: performing zero value compression (ZVC) on input data being input to the array of PEs.

Example 13 includes an accelerator integrated circuit (AIC), comprising: memory circuitry; and processor circuitry coupled with the memory circuitry, the processor circuitry comprising an array of processing elements (PEs), wherein each PE of the array of PEs includes a corresponding plurality of multiply-and-accumulate units (MACs) and a corresponding register file (RF) split into a plurality of RF instances.

Example 14 includes a method of operating a data sparsity level estimator (DSLE), the method comprising: receiving sparsity information for input activations (IFs) and weights (FLs) to be used for operating a neural network (NN); and activating or deactivating, based at least in part on the sparsity information, a set of multiply-and-accumulate units (MACs) of a plurality of MACs within each processing element (PE) of a PE array implemented by hardware accelerator circuitry, wherein each PE of the PE array includes a respective plurality of MACs and a plurality of register file (RF) instances split from respective RFs.

Example 15 includes the method of example 14 and/or some other example(s) herein, further comprising: determining an average combined sparsity values for the IFs and FLs based on the sparsity information; and determining to activate or deactivate the set of MACs based on the average combined sparsity values.

Example 16 includes the method of example 15 and/or some other example(s) herein, further comprising: determining a weight density that is known apriori; obtaining an activation density from a sparse encoder output of a layer of the NN; determining an average combined density based on a product of the activation density and the weight density; and determining the average combined sparsity from the average combined density.

Example 17 includes the method of example 16 and/or some other example(s) herein, wherein the activating or deactivating comprises: activating the set of MACs when the average combined sparsity is greater than a sparsity threshold value; and deactivating the set of MACs when the average combined sparsity is less than the sparsity threshold value.

Example 18 includes the method of example 17 and/or some other example(s) herein, further comprising: determining an actual number of cycles taken to perform a computation by activated ones of the plurality of MACs; and determining an expected number of cycles to perform the computation based on the average combined density and a number of operations for performing the computation.

Example 19 includes the method of example 18 and/or some other example(s) herein, further comprising: adjusting the sparsity threshold value based on a comparison of the expected number of cycles with the actual number of cycles.

Example 20 includes the method of example 19 and/or some other example(s) herein, wherein adjusting the sparsity threshold value comprises: increasing the sparsity threshold value when the expected number of cycles is less than the actual number of cycles; and one of: decreasing the sparsity threshold value when the expected number of cycles is greater than or equal to the actual number of cycles; or not changing the sparsity threshold value when the expected number of cycles is greater than or equal to the actual number of cycles.

Example 21 includes the method of example 20 and/or some other example(s) herein, wherein adjusting the sparsity threshold value further comprises: determining an amount to adjust the sparsity threshold value based on the comparison of the expected number of cycles with the actual number of cycles; generating threshold adjustment feedback signal to include the amount; and sending the threshold adjustment feedback signal to an operator that is configured to adjust the sparsity threshold value.

Example 22 includes the method of examples 14-21 and/or some other example(s) herein, wherein each PE of the PE array further includes a plurality of register files (RFs), each RF of the plurality of RFs has its own read and write ports, and a number of RFs of the plurality of RFs is equal to a number of MACs of the plurality of MACs.

Example Z01 includes one or more computer readable media comprising instructions, wherein execution of the instructions by processor circuitry is to cause the processor circuitry to perform the method of any one of examples 1-22 and/or some other example(s) herein.

Example Z02 includes a computer program comprising the instructions of example Z01.

Example Z03a includes an Application Programming Interface defining functions, methods, variables, data structures, and/or protocols for the computer program of example Z02.

Example Z03b includes an API or specification defining functions, methods, variables, data structures, protocols, etc., defining or involving use of any of examples 1-22 or portions thereof, or otherwise related to any of examples 1-22 or portions thereof.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry of example Z01 and the one or more computer readable media of example Z01.

Example Z07 includes a computing system comprising the one or more computer readable media and the processor circuitry of example Z01.

Example Z08 includes an apparatus comprising means for executing the instructions of example Z01.

Example Z09 includes a signal generated as a result of executing the instructions of example Z01.

Example Z10 includes a data unit generated as a result of executing the instructions of example Z01.

Example Z11 includes the data unit of example Z10 and/or some other example(s) herein, wherein the data unit is a datagram, network packet, data frame, data segment, a Protocol Data Unit (PDU), a Service Data Unit (SDU), a message, or a database object.

Example Z12 includes a signal encoded with the data unit of examples Z10 and/or Z11.

Example Z13 includes an electromagnetic signal carrying the instructions of example Z01.

Example Z14 includes a hardware accelerator configured to operate according to any of examples Z01-Z13 and/or one or more other example(s) herein.

Example Z15 includes a computing system comprising: a host platform comprising one or more application processors; and the hardware accelerator of example Z14 communicatively coupled with the host platform.

Example Z16 includes any of examples Z01-Z15 and/or one or more other example(s) herein, wherein the computing system and/or the processor circuitry comprises one or more of a System-in-Package (SiP), Multi-Chip Package (MCP), a System-on-Chips (SoC), a digital signal processors (DSP), a field-programmable gate arrays (FPGA), an Application Specific Integrated Circuits (ASIC), a programmable logic devices (PLD), a Central Processing Unit (CPU), a Graphics Processing Unit (GPU), a vision processing unit (VPU), a neural compute engine (NCE), and/or the computing system and/or the processor circuitry comprises two or more of SiPs, MCPs, SoCs, DSPs, FPGAs, ASICS, PLDs, CPUs, GPUs, VPUs, NCEs, interconnected with one another.

Example Z17 includes an apparatus comprising means for performing the method of any one of examples 1-22 and/or some other example(s) herein.

Any of the above-described examples may be combined with any other example (or combination of examples), unless explicitly stated otherwise. Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

6. Terminology

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configurable to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, PLD, SoC, SiP, MCP, DSP, etc., that are configurable to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "architecture" as used herein refers to a computer architecture or a network architecture. A "computer architecture" is a physical and logical design or arrangement of software and/or hardware elements in a computing system or platform including technology standards for interacts therebetween.

As used herein, the term "optical waveguide" can refer to any physical device or structure that guides light (e.g., an optical signal) in a confined manner. In embodiments, the optical waveguides include silicon-based optical waveguides having a core for confinement of light and formation of modes surrounded by a cladding or substrate, having a lower refractive index than the core.

The term "machine learning" or "ML" refers to the use of computer systems to optimize a performance criterion using example (training) data and/or past experience. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data).

The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm" refers to different concepts than the term "ML model," these terms may be used interchangeably for the purposes of the present disclosure. ML techniques generally fall into the following main types of learning problem categories: supervised learning, unsupervised learning, and reinforcement learning.

The term "supervised learning" refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "classification" in the context of ML may refer to an ML technique for determining the classes to which various data points belong. Here, the term "class" or "classes" may refer to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well) . . . .

The terms "regression algorithm" and/or "regression analysis" in the context of ML may refer to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The terms "instance-based learning" or "memory-based learning" in the context of ML may refer to a family of learning algorithms that, instead of performing explicit generalization, compares new problem instances with instances seen in training, which have been stored in memory. Examples of instance-based algorithms include k-nearest neighbor, decision tree Algorithms (e.g., Classification And Regression Tree (CART), Iterative Dichotomiser 3 (ID3), C4.5, chi-square automatic interaction detection (CHAID), etc.), Fuzzy Decision Tree (FDT), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest, and the like).

The term "feature" in the context of ML refers to an individual measureable property, quantifiable property, or characteristic of a phenomenon being observed. Features are usually represented using numbers/numerals (e.g., integers), strings, variables, ordinals, real-values, categories, and/or the like. A set of features may be referred to as a "feature vector." A "vector" may refer to a tuple of one or more values called scalars, and a "feature vector" may be a vector that includes a tuple of one or more features.

The term "unsupervised learning" refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning" refers to ML algorithms that develop ML models from incomplete training data, where a portion of the sample input does not include labels.

The term "reinforcement learning" or "RL" refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, and deep RL.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), etc.), deep stacking network (DSN), and Optical NNs (ONNs).

As used herein, the terms "sparse vector", "sparse matrix", and "sparse array" refer to an input vector, matrix, or array including both non-zero elements and zero elements. As used herein, the terms "ZVC data vector" "ZVC matrix", and "ZVC array" refer to a vector, matrix, or array that includes all non-zero elements of a vector, matrix, or array in the same order as a sparse vector, matrix, or array, but excludes all zero elements. As used herein, the term "dense vector", "dense matrix", and "dense array" refer to an input vector, matrix, or array including all non-zero elements.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The invention claimed is:

1. An accelerator integrated circuit, comprising:
   memory circuitry; and
   processor circuitry coupled with the memory circuitry, the processor circuitry comprising an array of processing elements (PEs), wherein a PE of the array of PEs includes a plurality of multiply-and-accumulate (MAC) units and a register file (RF) comprising a plurality of RF instances, wherein a RF instance is to store an input activation (IF) and a weight (FL), the IF and the FL are to be fed into a MAC unit of the plurality of MAC units, and the PE is to compute an output activation (OF) based on the IF and the FL.

2. The accelerator integrated circuit of claim 1, wherein each RF instance of the plurality of RF instances has its own read and write ports.

3. The accelerator integrated circuit of claim 1, wherein a number of RF instances of the plurality of RF instances is equal to a number of MAC units of the plurality of MAC units.

4. The accelerator integrated circuit of claim 3, wherein the processor circuitry further comprises a plurality of column buffers, wherein each column buffer of the plurality of column buffers is associated with a column of PEs in the PE array, and each column buffer comprises a number of entries equal to the number of RF instances.

5. The accelerator integrated circuit of claim 4, wherein the processor circuitry is configured to implement a time-space multiplexing scheme to deliver a number of data units over a load path to each PE of the array of PEs, wherein the number of data units is equal to the number of entries of each column buffer.

6. The accelerator integrated circuit of claim 1, wherein the plurality of MAC units is configured to operate on respective IFs and respective FLs to generate partial sums (pSums), wherein the plurality of MAC units are to operate independently from each other.

7. The accelerator integrated circuit of claim 6, wherein the PE further comprises an adder tree configured to compute the OF from the pSums.

8. The accelerator integrated circuit of claim 1, wherein the plurality of MAC units is configured to simultaneously operate on:
   IFs stored in IF subbanks, and
   FLs belonging to multiple different output channels and stored in FL subbanks.

9. The accelerator integrated circuit of claim 8, wherein the plurality of MACs is configured to operate on different ones of the output channels in parallel, and to repeat operation on the IFs a predefined number of times.

10. The accelerator integrated circuit of claim 1, wherein the memory circuitry is configured to store program code of a data sparsity level estimator (DSLE), and the processor circuitry is configured to operate the DSLE to:
    receive sparsity information for IFs including the IF or FLs including the FL;
    determine an average combined sparsity values based on the sparsity information; and
    activate or deactivate one or more MAC units of the plurality of MAC units.

11. The accelerator integrated circuit of claim 1, wherein the processor circuitry is configured to perform zero value compression (ZVC) on input data being input to the array of PEs.

12. One or more non-transitory computer-readable media (NTCRM) storing instructions, when executed by one or more processors, cause the one or more processors to:
    receive sparsity information for input activations (IFs) and weights (FLs) to be used for executing a neural network (NN);
    determine an average combined sparsity value for the IFs and FLs based on the sparsity information; and
    activate or deactivate, based on the average combined sparsity value, a plurality of multiply-and-accumulate (MAC) units in a processing element (PE) of a PE array implemented by hardware, wherein the PE includes a plurality of MAC units and a register file (RF) comprising a plurality of RF instances.

13. The one or more NTCRM of claim 12, wherein execution of the instructions is to further cause the one or more processors to:
    determine a weight density;
    obtain an activation density from a sparse encoder output of a layer of the NN;
    determine an average combined density based on a product of the activation density and the weight density; and
    determine the average combined sparsity from the average combined density.

14. The one or more NTCRM of claim 12, wherein, the instructions, when executed by the one or more processors, cause the one or more processors to activate or deactivate the plurality of MAC units by:
    activating one or more MAC units of the plurality of MAC units when the average combined sparsity is greater than a sparsity threshold value; and
    deactivating one or more MAC units of the plurality of MAC units when the average combined sparsity is less than the sparsity threshold value.

15. The one or more NTCRM of claim 14, further storing instructions, when executed by the one or more processors, cause the one or more processors to:
    determine an actual number of cycles taken to perform a computation by the one or more MAC units of the plurality of MAC units; and determine an expected number of cycles to perform the computation based on the average combined density and a number of operations for performing the computation.

16. The one or more NTCRM of claim 15, further storing instructions, when executed by the one or more processors, cause the one or more processors to:
adjust the sparsity threshold value based on a comparison of the expected number of cycles with the actual number of cycles.

17. The one or more NTCRM of claim 16, wherein the instructions, when executed by the one or more processors, cause the one or more processors to adjust the sparsity threshold value by:
increasing the sparsity threshold value when the expected number of cycles is less than the actual number of cycles;
decreasing the sparsity threshold value when the expected number of cycles is greater than or equal to the actual number of cycles; or
keeping the sparsity threshold value when the expected number of cycles is greater than or equal to the actual number of cycles.

18. The one or more NTCRM of claim 17, wherein the instructions, when executed by the one or more processors, cause the one or more processors to adjust the sparsity threshold value by:
determining an amount to adjust the sparsity threshold value based on the comparison of the expected number of cycles with the actual number of cycles;
generating a threshold adjustment feedback signal based on the amount; and
sending the threshold adjustment feedback signal to an operator that is configured to adjust the sparsity threshold value.

19. A method, comprising:
receiving sparsity information for input activations (IFs) and weights (FLs) to be used for executing a neural network (NN);
determining an average combined sparsity value for the IFs and FLs based on the sparsity information; and
activating or deactivating, based on the average combined sparsity value, a plurality of multiply-and-accumulate (MAC) units in a processing element (PE) of a PE array implemented by hardware, wherein the PE includes a plurality of MAC units and a register file (RF) comprising a plurality of RF instances.

20. The method of claim 19, wherein activating or deactivating, based on the average combined sparsity value, the plurality of MAC units comprises:
determining whether the average combined sparsity is greater than a sparsity threshold value;
in response to determining that the average combined sparsity is greater than a sparsity threshold value, activating one or more MAC units of the plurality of MAC units; and
in response to determining that the average combined sparsity is not greater than a sparsity threshold value, deactivating one or more MAC units of the plurality of MAC units.

* * * * *